(12) United States Patent  (10) Patent No.: US 8,310,758 B2
Miles et al.  (45) Date of Patent: Nov. 13, 2012

(54) PRINTABLE STATIC INTERFEROMETRIC IMAGES

(75) Inventors: Mark W. Miles, San Jose, CA (US); Brian W. Arbuckle, Danville, CA (US); Ion Bita, San Jose, CA (US); Manish Kothari, Cupertino, CA (US); Patrick F. Brinkley, San Mateo, CA (US); Gang Xu, Cupertino, CA (US); Nassim Khonsari, Redwood City, CA (US); Jonathan C. Griffiths, Fremont, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 0 days.

(21) Appl. No.: 13/207,874

(22) Filed: Aug. 11, 2011

(65) Prior Publication Data

US 2011/0292512 A1 Dec. 1, 2011

Related U.S. Application Data

(62) Division of application No. 12/116,791, filed on May 7, 2008, now Pat. No. 8,023,191.

(51) Int. Cl.
 *G02B 1/10* (2006.01)
(52) U.S. Cl. ......................... 359/580; 359/584; 359/589
(58) Field of Classification Search .................. 359/580, 359/584, 589; 347/2–4
 See application file for complete search history.

(56) References Cited

U.S. PATENT DOCUMENTS

| 6,040,937 | A  | * | 3/2000 | Miles | 359/291 |
| 6,055,090 | A  | * | 4/2000 | Miles | 359/291 |
| 6,394,870 | B1 | * | 5/2002 | Petruchik et al. | 445/24 |
| 6,674,562 | B1 |   | 1/2004 | Miles | |
| 6,987,590 | B2 | * | 1/2006 | Phillips et al. | 359/2 |
| 7,123,216 | B1 |   | 10/2006 | Miles | |
| 7,221,512 | B2 |   | 5/2007 | Steenblik et al. | |
| 7,327,510 | B2 |   | 2/2008 | Cummings et al. | |
| 8,164,810 | B2 | * | 4/2012 | Phillips et al. | 359/2 |
| 2002/0024711 | A1 | * | 2/2002 | Miles | 359/247 |
| 2002/0075555 | A1 | * | 6/2002 | Miles | 359/291 |
| 2002/0126364 | A1 | * | 9/2002 | Miles | 359/247 |
| 2004/0209195 | A1 |   | 10/2004 | Lin | |
| 2005/0002082 | A1 | * | 1/2005 | Miles | 359/276 |

(Continued)

FOREIGN PATENT DOCUMENTS

WO WO 97/17628 5/1997

OTHER PUBLICATIONS

ISR and WO dated Aug. 14, 2009 for PCT/US09/041990.

(Continued)

*Primary Examiner* — Frank Font
(74) *Attorney, Agent, or Firm* — Knobbe Martens Olson & Bear LLP

(57) ABSTRACT

A static interferometric image device including a plurality of solidified liquid layers is formed over a substrate by an inkjet process such that the layers are lateral to one another. In some embodiments, the substrate includes pre-defined cavities, and the liquid layers are formed in the cavities. In other embodiments, the substrate includes a substantially planar, stepped, or continuously transitioning surface, and the solidified liquid layers are formed on the surface. Optical fillers or spacers are provided for defining interferometric gaps between absorbers and reflectors in the display device, based at least partially on an image that the display device is designed to display.

23 Claims, 24 Drawing Sheets

U.S. PATENT DOCUMENTS

| | | | |
|---|---|---|---|
| 2005/0042449 A1* | 2/2005 | Phillips et al. | 428/375 |
| 2005/0286114 A1* | 12/2005 | Miles | 359/291 |
| 2006/0028708 A1* | 2/2006 | Miles | 359/290 |
| 2006/0066783 A1 | 3/2006 | Sampsell | |
| 2006/0110580 A1* | 5/2006 | Aylward et al. | 428/172 |
| 2006/0198998 A1* | 9/2006 | Raksha et al. | 428/323 |
| 2006/0262279 A1* | 11/2006 | Miles | 353/31 |
| 2006/0274400 A1* | 12/2006 | Miles | 359/291 |
| 2007/0132843 A1* | 6/2007 | Miles | 348/113 |
| 2007/0195392 A1* | 8/2007 | Phillips et al. | 359/15 |
| 2007/0206249 A1* | 9/2007 | Phillips et al. | 359/2 |
| 2007/0253054 A1* | 11/2007 | Miles | 359/290 |
| 2007/0275189 A1 | 11/2007 | Phillips et al. | |
| 2008/0032439 A1 | 2/2008 | Yan et al. | |
| 2008/0080038 A1* | 4/2008 | Miles | 359/237 |
| 2008/0259100 A1 | 10/2008 | Rengaswamy et al. | |
| 2009/0291213 A1 | 11/2009 | Ohshima et al. | |
| 2012/0075701 A1* | 3/2012 | Phillips et al. | 359/567 |

OTHER PUBLICATIONS

IPRP dated Nov. 18, 2010 for PCT/US09/041990.

Office Action dated Dec. 23, 2010 in U.S. Appl. No. 12/116,791.

* cited by examiner

PRINTABLE STATIC INTERFEROMETRIC IMAGES

CROSS-REFERENCE TO RELATED APPLICATIONS

This application claims priority to U.S. patent application Ser. No. 12/116/791, filed May 7, 2008, entitled "PRINTABLE STATIC INTERFEROMETRIC IMAGES," and assigned to the assignee hereof. The disclosure of the prior application is considered part of, and is incorporated by reference in this disclosure.

BACKGROUND

1. Field

This invention relates to optical interferometric modulator devices and methods for making the same. More particularly, this invention relates to static interferometric images and flexible manufacturing methods for making the same.

2. Description of the Related Art

Various types of interferometric modulators or interferometric light modulators have been developed for use as a display device. The term "interferometric modulator" or "IMOD" generally refers to a device that selectively absorbs and/or reflects light from at least two surfaces with relative pathlengths selected to enhance the reflection of particular wavelength(s) using the principles of optical interference. Microelectromechanical systems (MEMS) technology can be employed to produce active IMODs with at least two states (e.g., red and black).

Such interferometric modulators have a wide range of applications, and it would be beneficial in the art to utilize and/or modify the characteristics of these types of devices so that their features can be exploited in improving existing products and creating new products that have not yet been developed.

SUMMARY

In yet another aspect, a static interferometric image device includes: a substrate including a first surface; an absorber layer formed over the first surface; and a reflective layer formed over the first surface. The reflective layer is vertically spaced apart from the absorber layer. The device also includes a plurality of solidified optical fillers interposed between the absorber layer and the reflective layer. The plurality of optical fillers are formed of an at least partially transparent material. The plurality of optical fillers are positioned to form an array over the first surface of the substrate. The plurality of optical fillers are configured to define a pattern of optical paths between the absorber layer and the reflective layer, based on an image which the static interferometric image device is configured to display.

In yet another aspect, a static interferometric image device includes a substrate including a plurality of cavities having substantially the same depth. The cavities have bottom surfaces. The device also includes an absorber layer formed over the substrate and a reflective layer opposing the absorber layer. The reflective layer is vertically spaced apart from the absorber layer. At least one of the absorber layer and the reflective layer is positioned in the cavities. The device further includes a plurality of solidified spacers formed in the cavities. The solidified spacers are contacted by and interposed between the bottom surfaces of the cavities and the at least one of the absorber layer and reflective layer. The plurality of solidified spacers are configured to position the at least one of the absorber layer and reflective layer to define a pattern of optical paths between the absorber layer and the reflective layer, based on an image which the static interferometric image device is configured to display.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments will also be better understood with reference to the appended claims and drawings which form part of this disclosure. In addition, various changes, modifications, combinations and sub-combinations may be made without departing from the spirit and scope of the invention, as defined by the appended claims. These and other embodiments of the invention will become readily apparent to those skilled in the art from the following detailed description of the preferred embodiments having reference to the attached figures, the invention not being limited to any particular preferred embodiment(s) disclosed.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image (e.g., still image), and whether textual or pictorial. More particularly, it is contemplated that the embodiments may be implemented in or associated with a variety of devices such as, but not limited to, photographs, billboards or signs, architectural structures, packaging, and aesthetic structures (e.g., display of images on a piece of jewelry).

In some embodiments, a static interferometric image may include optical spacers or fillers to define interferometric gaps between absorbers and reflectors of the display. The optical spacers or fillers may be formed by a printing process. The printing process provides one or more liquid compositions on a substrate to form liquid layers thereon. The liquid layers can be baked to form solid layers forming optical spacers or fillers. The optical spacers or fillers have different thicknesses or optical properties (indices of refraction) to interferometrically produce a pattern of desired colors (e.g., red, green, and blue) based on an image that the image is designed to display. In several embodiments, the printing process can be programmed to produce the different colors in different regions, thus producing interferometric images that can be readily designed and implemented without high tooling or production line costs.

Figure 1:
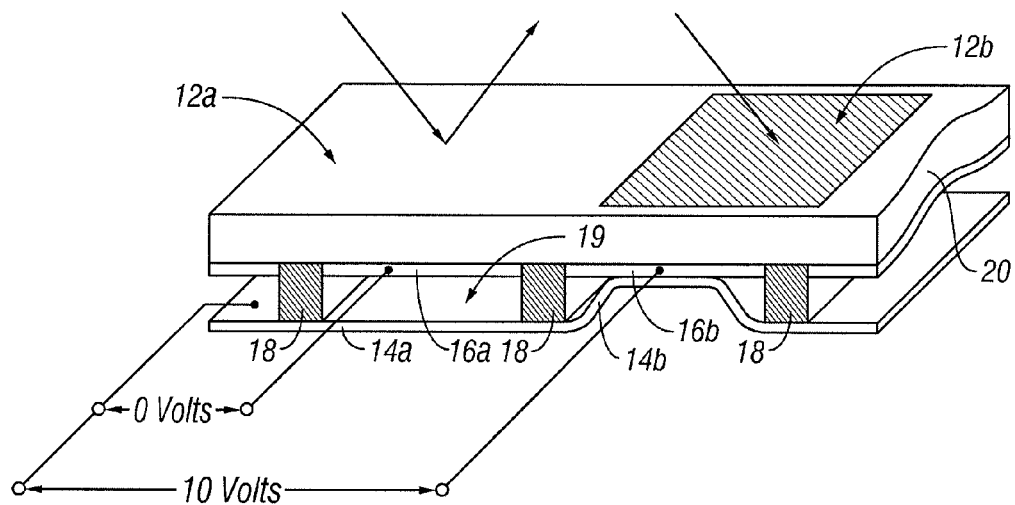
FIG. 1 is an isometric view depicting a portion of an active interferometric modulator or IMOD display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metallic layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap or cavity 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
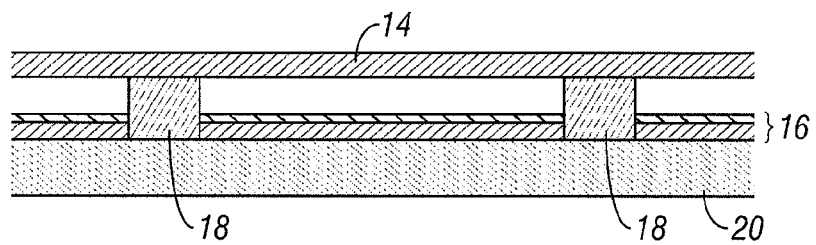
FIG. 2 is a cross section of the device of FIG. 1.
Figure 3:
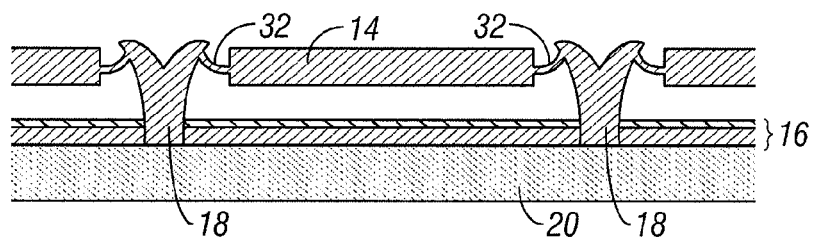
FIG. 3 is a cross section of another design for an active interferometric modulator.
Figure 4:
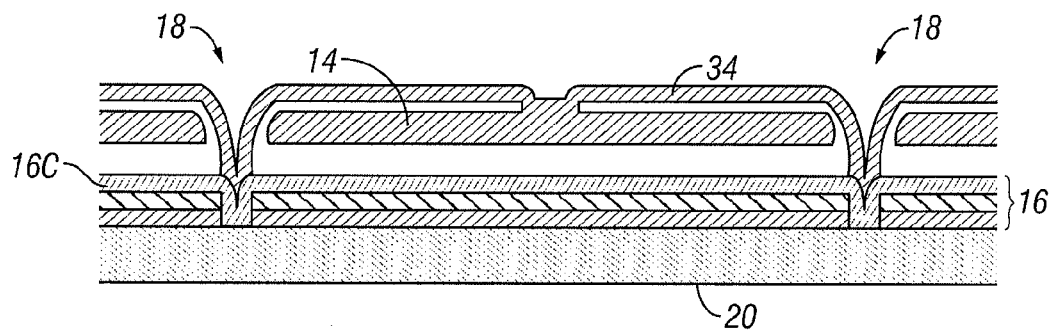
FIG. 4 is a cross section of another design for an active interferometric modulator.
Figure 5:
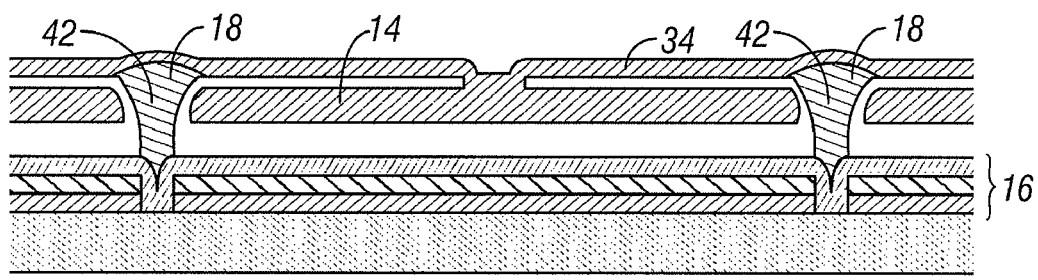
FIG. 5 is a cross section of yet another design for an active interferometric modulator.
Figure 6:
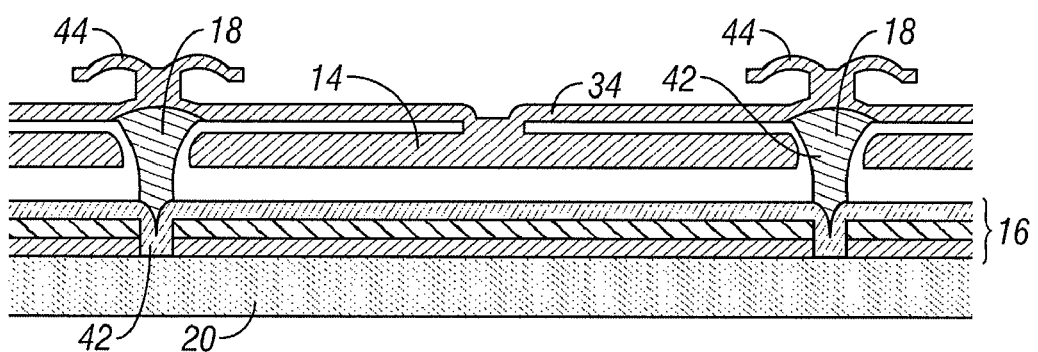
FIG. 6 is a cross section of an additional design for an active interferometric modulator.

The details of the structure of interferometric modulators that operate in accordance with the principles set forth above may vary widely. For example, FIGS. 2-6 illustrate five different embodiments of the movable reflective layer 14 and its supporting structures. FIG. 2 is a cross section of the embodiment of FIG. 1, where a strip of metal material 14 is deposited on orthogonally extending supports 18. In FIG. 3, the moveable reflective layer 14 is attached to supports at the corners only, on tethers 32. In FIG. 4, the moveable reflective layer 14 is suspended from a deformable layer 34, which may comprise a flexible metal. The deformable layer 34 connects, directly or indirectly, to the substrate 20 at various locations. The connections are herein referred to as support structures or posts 18. The embodiment illustrated in FIG. 5 has support structures 18 including support post plugs 42 upon which the deformable layer 34 rests. The movable reflective layer 14 remains suspended over the cavity, as in FIGS. 2-4, but the deformable layer 34 does not form the support posts 18 by filling holes between the deformable layer 34 and the optical stack 16. Rather, the support posts 18 are formed of a planarization material, which is used to form support post plugs 42. The embodiment illustrated in FIG. 6 is based on the embodiment shown in FIG. 5, but may also be adapted to work with any of the embodiments illustrated in FIGS. 2-4 as well as additional embodiments not shown. In the embodiment shown in FIG. 6, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIGS. 2-6, the interferometric modulators function as direct-view devices, in which images are viewed from the front side of the transparent substrate 20, the side opposite to that upon which the movable electrode is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other.

Static Interferometric Image Formation Using a Printing Process

It will be understood that although the embodiments of interferometric modulators discussed above relate to interferometric modulators ("IMODs") having movable electrodes, other embodiments are possible. In particular, a static interferometric image may be provided, which includes a first partially reflective layer and a second layer which is at least partially reflective, separated by an interferometric gap defined by air or a light-transmissive material. The term "static interferometric image" refers to a device configured to display a static image using interferometric effect. The static image can include a black and white image and/or a color image. Images, patterns, or arrays can thus be monochromatic or multicolored, as long as an image is formed where at least one "color" (including black) is formed by principles of interferometrics.

It will be understood that the second reflective layer may be partially reflective, or may be fully reflective, depending on the embodiment. For convenience, the first partially reflective layer, for which partial transmission is functionally significant, may be referred to herein as a partially reflective layer or an optical absorber. In an IMOD, the "absorber" (first reflective layer) is typically closest to the viewer, while the "reflector" (second reflective layer) is farther from the viewer. The second reflective layer may be referred to as a reflective layer or reflector. For "transflective" IMODs, the second reflective layer can also be partially transmissive, with concomitant trade-offs between intensity of the displayed interferometric color and the amount of light allowed through the IMOD. The two layers together may be referred to collectively as reflective layers, although it will be understood that the use of the term reflective layer is not intended to exclude partially reflective layers, and at least one of the layers is partially transmissive.

In such a static interferometric image, there is no need to select or include conductive materials for use as electrodes, as the static interferometric image need not be electrostatically actuatable. Similarly, the reflective layers need not be electrically isolated from one another, as there is no need to apply a voltage across the two layers (because there is neither movement nor relaxation from an actuated state). Thus, conductive or non-conductive material may be used to form the reflective layers, and conductive or non-conductive material may be used to define the interferometric gap or "optical cavity." A static interferometric image may comprise an air gap or one or more light-transmissive layer(s). It will be understood that the use of a solid material to define the optical cavity may provide additional stability.

In some embodiments, a static interferometric image may include optical spacers or fillers to define interferometric gaps or optical cavities between absorbers and reflectors of the display. In the context of this document, the term "optical filler" refers to a layer or material positioned in the optical cavity between an absorber and a reflector while forming at least a portion of an optical interferometric path. The term "spacer" refers to a layer or material positioned outside the optical cavity between an absorber and a reflector while defining the spacing or optical cavity between the absorber and the reflector by dictating the position of one of the absorber and reflector with respect to the other. One or both of the optical filler and/or spacer is printed (at least in part) to define the optical pathlength in the optical cavity.

The optical fillers or spacers may be formed by a printing process. The printing process directly deposits material(s) in a desired pattern to individually form layer(s) (e.g., fillers or spacers) that define at least part of an optical cavity which affects an optical pathlength for producing an interferometric color. The printing process may include forming no optical fillers or spacers over some of regions of a substrate, and forming optical fillers or spacers with different thicknesses and/or refraction indices over other regions of the substrate so as to produce a color image. In certain embodiments, the printing process may include depositing nothing over some of regions of a substrate and depositing a material to substantially the same thickness over other regions of the substrate so as to produce a monochromic image.

The printing process may be programmed according to a desired image or pattern. Programming of the printing process can be performed by providing electronic image data to a computer or its equivalent. The image data can include a plurality of displayable elements, e.g., pixels. Each pixel includes a level of luminance or chrominance. Each pixel may also include sub-pixels, each of which represents, for example, one of red, green, or blue. The electronic image data is converted into a set of instructions indicating amounts and/or kinds of materials that will be provided over regions of a substrate by the printing process. The printing process may be a wet printing process (e.g., inkjet printing) or a dry printing process (e.g., dry transfer).

The printing process may be performed for forming pixels over regions of a substrate. The printing process may include depositing a material (e.g., optical filler or spacer) that defines at least part of an optical path in each region such that there are at least two different layers in two different regions to produce two different interferometric colors. In other embodiments, the printing process may include depositing one or more materials over different regions of a substrate such that there are three different layers in three different regions to produce three different interferometric colors. The process may control the composition (governing density and index of refraction) and/or thicknesses of the layers for individual pixels, each of which has an area of, for example, less than 500 μm×500 μm. By direct deposition in a programmable fashion, time consuming and expensive masking steps can be avoided.

The printing process may provide one or more liquid compositions on a substrate to form liquid layers thereon. In one embodiment, the substrate may have pre-formed cavities therein, and the liquid composition may be provided into the cavities. In another embodiment, the substrate may have cavities defined by a lattice grid attached to or deposited on the substrate, and the liquid composition may be provided into the cavities. In these embodiments, the volume of the liquid composition provided into the cavities needs to be controlled to form a layer having a desired thickness.

In other embodiments, the liquid composition may be provided on a substrate having a substantially flat, stepped, or continuously transitioning top surface without cavities. In such embodiments, forming a layer having a desired thickness may require volume control, precision dispensation, and/or a suitable combination of liquid composition viscosity (or surface tension) and properties (e.g., hydrophobic or hydrophilic) of a surface on which the liquid composition is deposited.

The liquid layers are then solidified to form transparent or colored solid layers forming optical fillers or spacers. In one embodiment, the liquid layers are dried in a separate step if needed, e.g., baked, to form the solid layers. The optical fillers or spacers may have different thicknesses or optical properties (indices of refraction) to interferometrically produce a desired pattern of colors (e.g., red, green, and blue) based on an image that the display is designed to display. In this manner, in all of the embodiments described below, the sizes of optical cavities are defined by the optical fillers or spacers which are programmably deposited by the printing process to have different thicknesses and/or refraction indices in different regions, thus producing different optical pathlengths and interferometric colors in different regions to produce the desired image.

Figure 7:
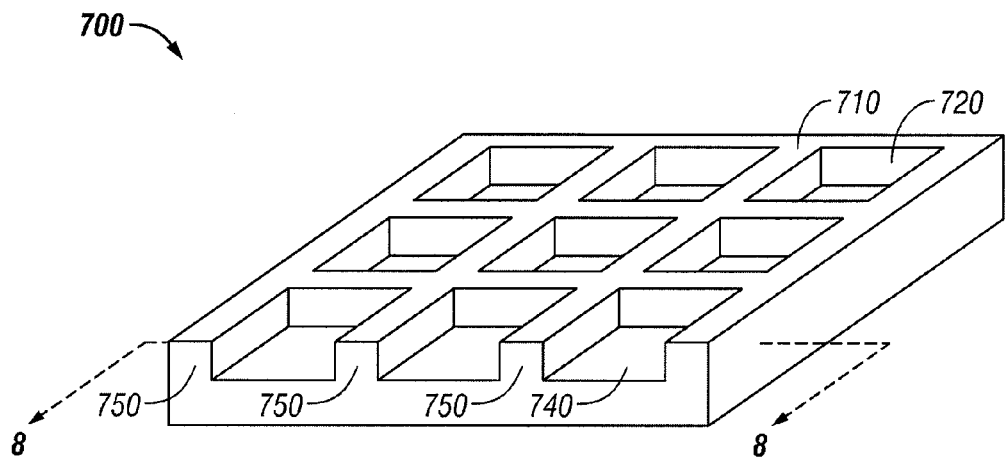
FIG. 7 is a schematic perspective view of one embodiment of a substrate having pre-formed cavities for a static interferometric image.
Figure 8:
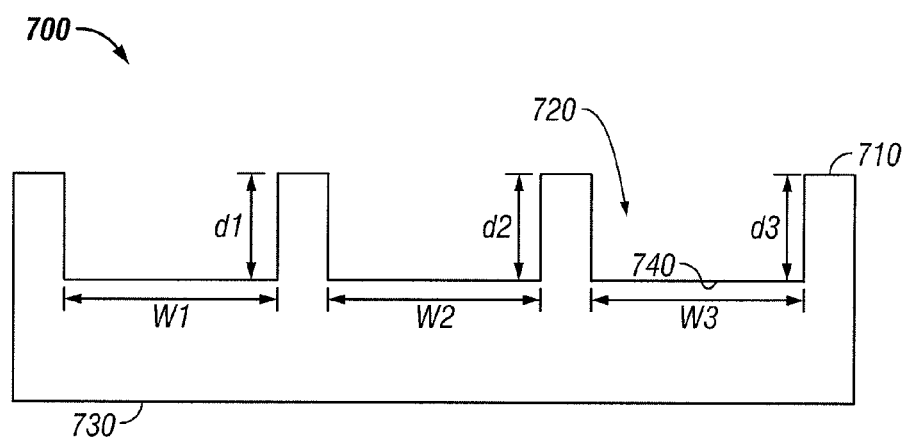
FIG. 8 is a cross section of the substrate of FIG. 7, taken along lines 8-8.

1. Inkjet Process on a Substrate with Pre-formed Cavities
  a. Preparation of a Substrate with Cavities In one embodiment, a static interferometric image is formed by performing an inkjet process on a substrate having pre-formed recesses or cavities. Referring to FIGS. 7 and 8, a substrate 700 includes a top surface 710, cavities 720 formed in the top surface 710, and a bottom surface 730. The cavities 720 form a lattice structure 750 in the substrate 700.

In the illustrated embodiment, the cavities 720 include a bottom surface 740 that is substantially flat. Each of the three cavities 720 shown in FIG. 8 has a depth, d1, d2, or d3 which is defined as a vertical distance between the top surface 710 of the substrate 700 and the bottom surface 740 of the cavity. The illustrated cavities 720 have the same depth as one another (d1=d2=d3), and the depth of the cavities may be between about 300 Å and about 1.5 μm, particularly about 0.5 μm. In other embodiments, the cavities 720 may have different depths, as will be described below. Each of the cavities 720 may have a width w1, w2, or w3. The widths and lengths of the cavities 820 can have any desired dimensions, depending upon the desired resolution for the image(s) being formed. In one embodiment, the width w1, w2, w3 may be between about 50 µm and about 500 µm, and particularly about 100 µm. The illustrated cavities 720 have a square shape when viewed from above. In other embodiments, cavities in a substrate can have various other shapes, e.g., rectangular, circular, oval, or diamond shape, or a combination of two or more of the foregoing.

The substrate 700 may be formed of a substantially transparent material. Examples of transparent materials include, but are not limited to, glass and transparent polymeric materials. In other embodiments, the substrate 700 may be formed of an opaque material. In certain embodiments, the substrate may include a stainless steel plate laminated with a polymeric material (e.g., polyethylene). In some embodiments, the substrate may be formed of a flexible material.

The substrate 700 may be shaped by any method suitable for removing or shaping portions of the substrate or forming cavities into a surface of the substrate 700. Examples of such methods include, but are not limited to, embossing, photolithography and etching, and inscribing. Because the substrate 700 is shaped without adding an additional material to the substrate 700 in the methods described above, the lattice structure may be formed integrally with and of the same material as the substrate 700.

Figure 9A:
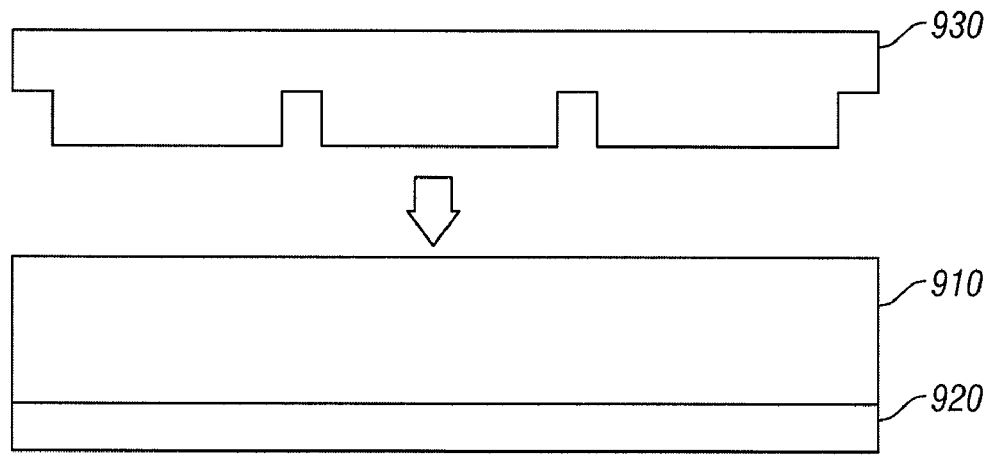
FIGS. 9A-9C illustrate one embodiment of a method of making a substrate having pre-formed cavities using an embossing process.
Figure 9B:
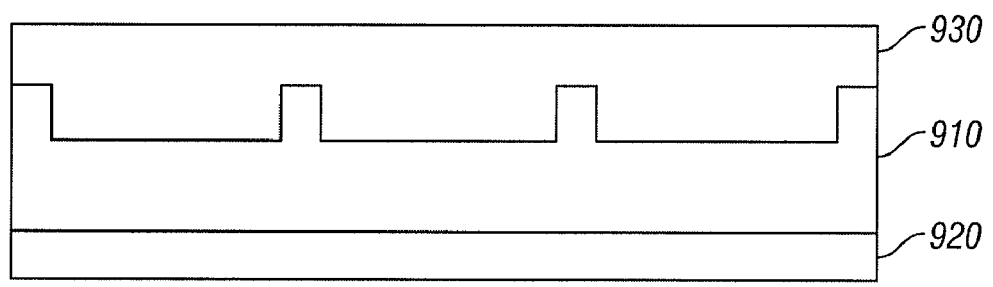
Figure 9C:
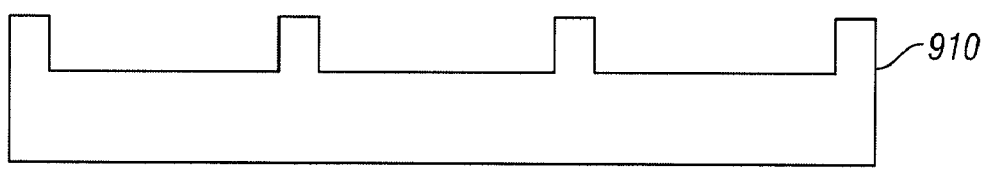

FIGS. 9A-9C are cross sections illustrating a method of forming cavities in a substrate according to one embodiment. The illustrated method uses embossing for forming cavities in the substrate. As shown in FIG. 9A, a substantially flat substrate 910 is placed on a platen 920. The substrate 910 may be formed of glass or other material that is readily made malleable for shaping. The illustrated platen 920 may be formed of a metallic material. The substrate 910 may be heated such that the substrate 910 is soft enough to impress at a subsequent embossing step. The substrate 910 may be heated to a temperature which varies depending on the material used for the substrate 910.

Then, an embossing plate 930 is pressed onto the softened substrate 910, as shown in FIG. 9B. The embossing plate 930 has recesses and protrusions shaped to define cavities in the substrate 910. The embossing plate 930 may be formed of a metallic material. In certain embodiments, at least one of the platen 920 and the embossing plate 930 may be in a form of a rotating cylinder. A skilled artisan will appreciate that various other embossing techniques may also be adapted for shaping the substrate 910.

Then, the embossing plate 930 is removed from the substrate 910. Subsequently, the embossed substrate 910 is removed from the platen 920. The resulting substrate 910 is shown in FIG. 9C.

In another embodiment, the substrate 910 may be shaped by selectively removing portions of a substrate using photolithography and etching technique. In yet another embodiment, the substrate 910 may be shaped by first inscribing predetermined portions of a substrate and then selectively etching the portions. The term "inscribing" may be used interchangeably with marking or scoring. Inscribing may be conducted using various techniques, e.g., machining or laser-inscribing. An automatic inscribing method is available from Nippon Sheet Glass, Co., Ltd, Tokyo, Japan. The embossing technique shown in FIGS. 9A-9D can be conducted without a masking process. In addition, a patterned plate can be repeatedly used for many substrates. It will be appreciated that various other techniques may also be used for shaping the substrate 910.

b. Inkjet Process on a Substrate with Cavities Having the Same Depth

Referring to FIGS. 10A-10F, a method of making a static interferometric image according to one embodiment will now be described. The static interferometric image is formed by performing a printing process on a substrate having cavities of the same depth. The printing process is performed to form at least two different layers that have different thicknesses in two different regions.

Figure 10A:
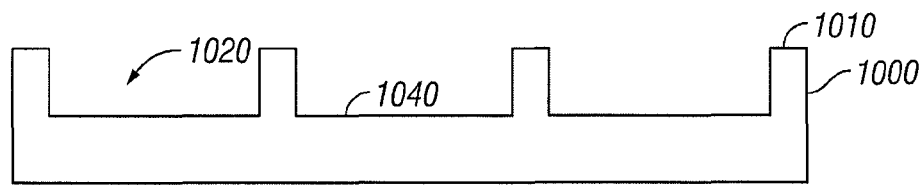
FIGS. 10A-10E illustrate one embodiment of a method of making a static interferometric image, including performing a printing process to programmably produce different interferometric colors on a substrate having pre-formed cavities of the same depth.

First, a substrate 1000 including cavities 1020 of the same depth is provided, as shown in FIG. 10A. The substrate 1000 may be formed of an opaque material. In other embodiments, the substrate 1000 may be formed of a transparent material. The cavities 1020 can be formed by any suitable process, e.g., embossing, photolithography and etching, and inscribing.

Figure 10B:
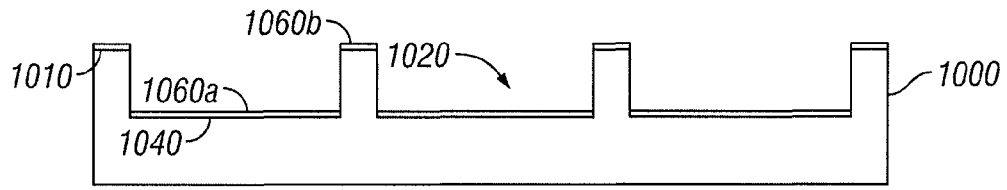

A reflector or reflective layer 1060a, 1060b is deposited by any suitable thin film technique (e.g., sputtering or physical or chemical vapor deposition) on the bottom surfaces 1040 of the cavities 1020 and on the top surface 1010 of the substrate 1000, as shown in FIG. 10B. The reflector 1060a, 1060b is discontinuous between the bottom surfaces 1040 of the cavities 1020 and the top surface 1010 of the substrate 1000 due to a directional deposition, such as sputtering. In another embodiment, the reflector may be continuous and conformal over the bottom surfaces 1040 of the cavities 1020 and the top surface 1010 of the substrate 1000.

The reflector 1060a, 1060b may be formed of a specular or reflective metal, for example, Al, Au, Ag, or an alloy of the foregoing, and is preferably thick enough to reflect substantially all visible light incident upon the substrate 1000 for interferometric effect. In an embodiment where the reflector 1060a, 1060b is formed of Al, the reflector 1060a, 1060b may have a thickness of about 300 Å. The thicknesses of the reflector 1060a, 1060b may vary widely in other embodiments. In certain embodiments, the substrate 1000 itself may be formed of a reflective material. In such embodiments, the substrate 1000 does not include a separate reflector.

Figure 10C:
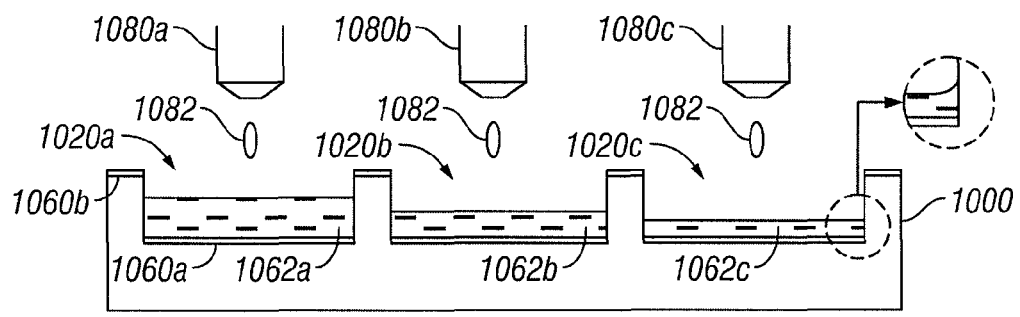

Subsequently, an inkjet process is performed to form liquid layers 1062a-1062c in the cavities 1020a-1020c, as shown in FIG. 10C. In the illustrated embodiment, multiple micro-nozzles 1080a-1080c are aligned over the substrate 1000 with the cavities 1020a-1020c. In another embodiment, a single micro-nozzle that moves over or scans the substrate may be used. In yet another embodiment, multiple micro-nozzles that move over or scan the substrate can be used. A liquid composition 1082 is provided into the cavities 1020a-1020c through the micro-nozzles 1080a-1080c.

The liquid composition 1082 can be either a solution or a dispersion (or suspension). In one embodiment where the liquid composition is a solution, a solute in the solution can be a material that can form a solid that is at least partially transparent and has optical properties suitable for producing interferometric effect. Examples of such materials include, but are not limited to, polyimide and poly-vinyl acetate. The solvent can be a liquid that can dissolve a selected solute while being sufficiently volatile so as to be removed without excessive treatment. Examples of solvents include, but are not limited to, polyvinyl pyrrolidone, isopropyl alcohol, acetone, tetra-chloroethylene, toluene, turpentine, methyl acetate, ethyl acetate, hexane, citrus, terpenes, methyl ethyl ketone, benzene, ether, dimethyl sulfoxide, and N-methyl-2-pyrollidone. The liquid composition can have a viscosity between about $5 \times 10^{-3}$ Pa·S and about 0.1 Pa·S.

In another embodiment where the liquid composition is a dispersion, particles in the dispersion can also be formed of a material that can form a solid that is at least partially transparent and has optical properties suitable for producing interferometric effect. Examples of such materials include, but are not limited to, $SiO_2$, $Al_2O_3$, Ge, and tetraethyl orthosilicate (TEOS). The particles may be spherical, having an average diameter between about 10 nm and about 100 nm. The particles may have other shapes. In certain embodiments, the dispersion may be subjected to a sol-gel process to form a solid. A liquid in the dispersion can be one that can be sufficiently volatile so as to be removed without excessive treatment. Examples of such liquids include, but are not limited to, polyvinyl pyrrolidone, isopropyl alcohol, acetone, tetrachloroethylene, toluene, turpentine, methylacetate, ethyl acetate, hexane, citrus, terpenes, methyl ethyl ketone, benzene, ether, dimethyl sulfoxide, and N-methyl-2-pyrollidone.

In the illustrated embodiment, the liquid composition 1082 provided into all the cavities 1020a-1020c has the same solute in the same solvent in substantially the same concentration, but is injected in different amounts in different cavities 1020a-1020c. In other embodiments, the liquid composition 1082 may have the same solute in the same solvent, but different concentrations from one another.

In the illustrated embodiment, the liquid composition 1082 is simultaneously provided into the cavities 1020a-1020c. In other embodiments, the liquid composition 1082 may be provided into some of the cavities at one point in time and into others at another point in time. For example, the liquid composition 1082 may be provided first in a first set of cavities in which the resulting liquid layers will have a first thickness (for example, for red color). Then, the liquid composition 1082 may be provided in a second set of cavities in which the resulting liquid layers will have a second thickness (for example, for green color). Subsequently, the liquid composition 1082 may be provided in a third set of cavities in which the resulting liquid layers will have a third thickness (for example, for blue color).

In other embodiments, the liquid layers may be formed by selectively stacking liquid layers over one another to have different total thicknesses in different cavities. For example, first liquid layers are deposited in substantially all of cavities in a substrate. Then, second liquid layers may be selectively stacked over some, but not all, of the first liquid layers. Subsequently, third liquid layers may be further selectively stacked over some, but not all, of the second liquid layers. In this manner, the cavities can include liquid layers of different total thicknesses.

The thicknesses of the liquid layers 1062a-1062c are selected such that the resulting solid layers have selected thicknesses to provide optical cavities for producing a desired pattern of colors or grayscale tones in the resulting display. The liquid layers 1062a-1062c may shrink in the vertical direction when the solvent in the liquid layers 1062a-1062c is evaporated by a subsequent drying step described below. Thus, the thicknesses of the liquid layers 1062a-1062c are thicker than the desired thicknesses of the solid layers resulting from the drying step.

The pattern of the colors or grayscale tones forms a desired image in the display. In addition, the thicknesses of the layers 1062a-1062c are selected based at least partly on the optical density (index of refraction) of the solid layer material. A skilled artisan will appreciate that a thickness of a solid layer can be selected for interferometrically reflecting a specific color (e.g., red, green, or blue) when a specific material is used for the solid layer. In one embodiment where the solid layer is formed of polyimide which has an index of refraction of 1.7, the thicknesses of the solid layers for red, green, and blue are about 82 nm, about 106 nm, and about 135 nm, respectively.

The liquid layers 1062a-1062c may be dried in a separate step, if needed, e.g., baked to remove the solvent or liquid, and form solid layers including only the solute or particles. This baking process may be performed at a temperature between about 80° C. and about 250° C. In other embodiments, the liquid layers 1062a-1062c may be exposed to UV for polymerization or solidification. The solid layers form optical fillers which provide an optical or interferometric gap for producing interferometric effect in the display. The solid layers may form have slight non-uniformities at the edges thereof because the liquid layers 1062a-1062c as deposited may form a meniscus by surface tension and interaction with sidewall surfaces of the cavities 1020a-1020c, as shown in the circle in FIG. 10C.

In certain embodiments, the same amount and concentration of the liquid composition is provided into all the cavities 1020a-1020c, forming liquid layers having substantially the same thickness. Then, the liquid layers may be dried in a separate step, if needed, e.g., baked to form transparent solid layers having substantially the same thickness. The thicknesses of the solid layers can be selectively reduced by a suitable process, e.g., laser ablation, to have selected thicknesses to interferometrically produce a pattern of desired colors or grayscale tones in the resulting display.

Figure 10D:
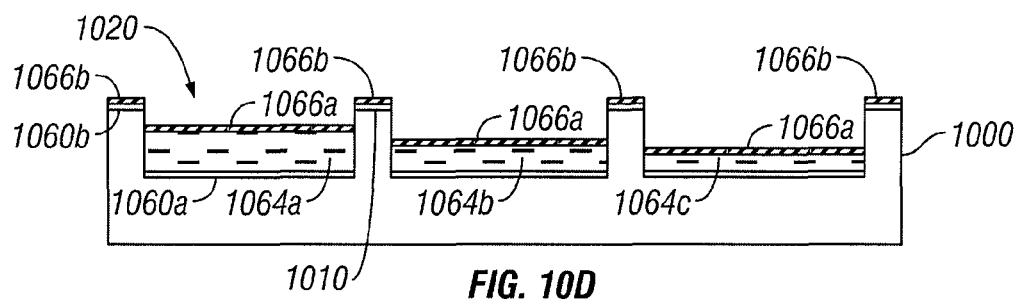

Referring now to FIG. 10D, an absorber 1066a, 1066b is deposited by any suitable thin film technique (e.g., sputtering or physical or chemical vapor deposition) on the solid layers (or optical fillers) 1064a-1064c, and on top of the reflectors 1060b on the top surface 1010 of the substrate 1000. In the illustrated embodiment, the absorber 1066a, 1066b is discontinuous between the cavities 1020 and the top surface 1010 of the substrate 1000 due to a directional deposition. In other embodiments, at least a portion of the absorber 1066a, 1066b may be continuous between the cavities 1020 and the top surface 1010 of the substrate 1000. The absorber 1066a, 1066b may be formed of a semi-transparent thickness of metal, such as chromium (Cr) or germanium (Ge). The absorber 1066a, 1066b may have a thickness between about 1 Å and about 100 Å, particularly between about 50 Å and about 100 Å.

Figure 10E:
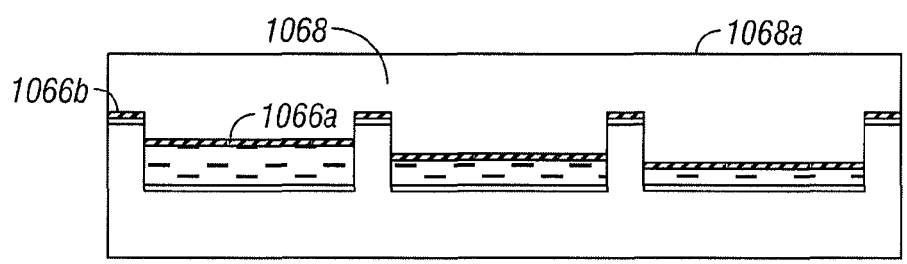

Subsequently, as shown in FIG. 10E, a transparent polymer layer 1068 may be formed over the absorber 1066a, 1066b to cover substantially the entire top surface of the absorber 1066a, 1066b, and provide a substantially planar top surface 1068a. The transparent polymer layer 1068 may be formed of acrylic polymer, polyimide, or a spin-on-glass material. The planar top surface 1068a may form a displaying surface through which an image is displayed. In another embodiment, a substrate formed of a substantially transparent material may be provided over the substrate 1000 without forming the transparent polymer layer 1068. In certain embodiments, an additional layer or plate may be provided over the transparent polymer layer 1068. Examples of such additional layers are a protective layer and an antireflection (AR) coating layer. Preferably, neither the transparent polymer layer 1068 nor additional layers change the interferometric effect, as they are outside they optical cavity.

Figure 11A:
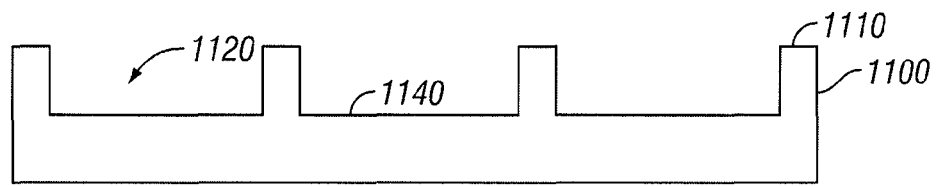
FIGS. 11A-11D illustrate another embodiment of a method of making a static interferometric image, including performing a printing process to programmably produce different interferometric colors on a substrate having pre-formed cavities of the same depth.
Figure 11B:
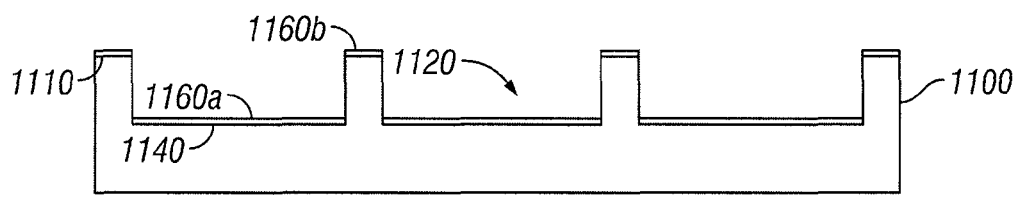

Referring to FIGS. 11A-11D, a method of making a static interferometric image according to another embodiment, in which filler thicknesses can be the same while the indices of refraction in pixels or recesses are selected to modulate different interferometric colors, will now be described. The static interferometric image is formed by performing a printing process on a substrate having recesses or cavities of the same depth. A printing process forms at least two different layers that have different indices of refraction in two different regions. A substrate 1100 including cavities 1120 of the same depth is provided, as shown in FIG. 11A. Subsequently, a reflector 1160a, 1160b is deposited on the bottom surfaces 1140 of the cavities 1120 and on the top surface 1110 of the substrate 1100, as shown in FIG. 11B. Details of these steps can be as described above with reference to FIGS. 10A and 10B.

Figure 11C:
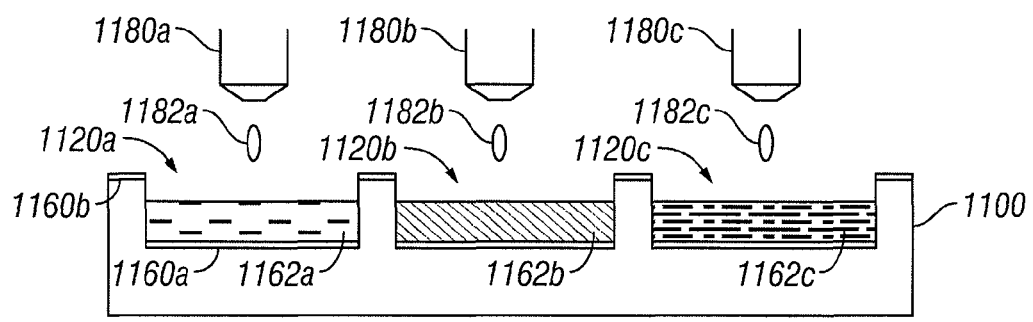
Figure 11D:
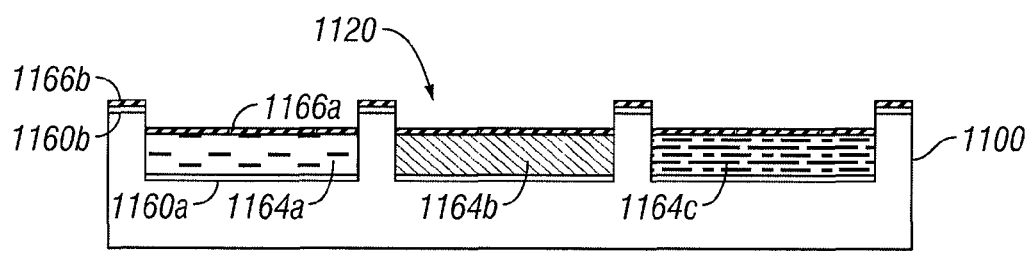

Subsequently, an inkjet process is performed to form liquid layers 1162*a*-1162*c* in the cavities 1120*a*-1120*c*, as shown in FIG. 11C. In the illustrated embodiment, multiple micro-nozzles 1180*a*-1180*c* are aligned over the substrate 1100 with the cavities 1120*a*-1120*c*. Different kinds of liquid compositions 1182*a*-1182*c* are provided into the cavities 1120*a*-1120*c* through the micro-nozzles 1180*a*-1180*c*. The amounts of liquid compositions 1182*a*-1182*c* are chosen to result in solid layers having substantially the same thickness after drying. The resulting liquid layers 1162*a*-1162*c* may have a thickness between about 1 μm and about 10 μm. The illustrated method uses three different kinds of liquid compositions 1182*a*-1182*c*: a first liquid composition 1182*a* for interferometrically producing a red color; a second liquid composition 1182*b* for interferometrically producing a green color; and a third liquid composition 1182*c* for interferometrically producing a blue color. The first to third liquid compositions 1182*a*-1182*c* contain solutes or particles which will form solid layers after being dried or baked at a next step. The solutes or particles may be dyed polymers. In certain embodiments, the polymers may have absorptive colors to enhance color saturation while reducing brightness. In other embodiments, other types of liquid compositions can be used for forming solid layers of other colors. Other details of the inkjet process can be as described above with reference to FIG. 10C.

Subsequently, the liquid layers 1162*a*-1162*c* are dried, such as by baking, to remove the solvent or liquid, and form solid layers including only the solute or particles. The solid layers form optical fillers which provide an optical gap for producing interferometric effect in the display device. In one embodiment, a first set of solid layers for first-order red color can have a thickness of about 118 nm, and a refraction index between about 1.5 and about 1.6. A second set of solid layers for first-order green color can have a thickness of about 92 nm, and a refraction index between about 1.5 and about 1.6. A third set of solid layers for first-order blue color can have a thickness of about 72 nm, and a refraction index between about 1.5 and about 1.6. In other embodiments, the first to third sets of solid layers can have thicknesses and refraction indices for second- or third-order color.

Next, an absorber 1166*a*, 1166*b* is deposited on the solid layers 1164*a*-1164*c*, and on top of the reflectors 1160*b* on the top surface 1110 of the substrate 1100. Subsequently, a transparent polymer layer (not shown) may be formed over the absorber 1166*a*, 1166*b* to cover substantially the entire top surface of the absorber 1166*a*, 1166*b*, and provide a substantially planar top surface. The details of the steps following the printing process can be as described above with reference to FIGS. 10D and 10E.

Referring to FIGS. 12A-12D, a method of making a static interferometric image according to yet another embodiment, in which the filler thickness and the index of refraction in each pixel or recess are selected to modulate interferometric color, will now be described. The static interferometric image is formed by performing a printing process on a substrate having cavities of the same depth. The printing process forms at least two different layers that have different thicknesses and indices of refraction in two different regions.

Figure 12A:
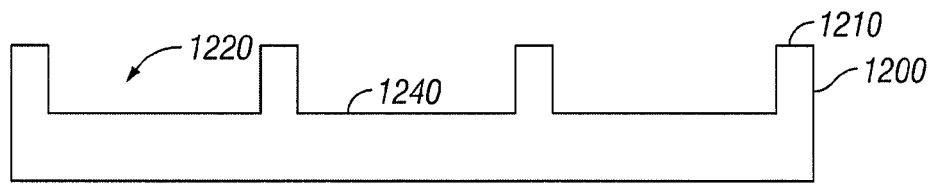
FIGS. 12A-12D illustrate yet another embodiment of a method of making a static interferometric image, including performing a printing process to programmably produce different interferometric colors on a substrate having pre-formed cavities of the same depth.
Figure 12B:
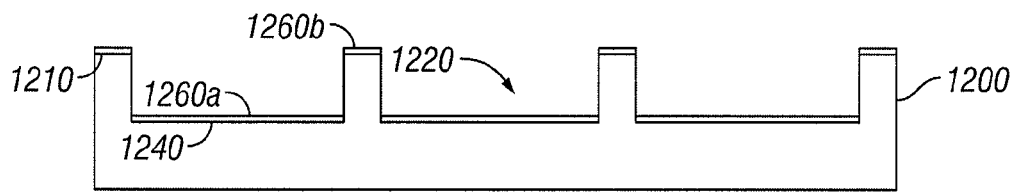

A substrate 1200 including cavities 1220 of the same depth is provided, as shown in FIG. 12A. Subsequently, a reflector 1260*a*, 1260*b* is deposited on the bottom surfaces 1240 of the cavities 1220 and on the top surface 1210 of the substrate 1200, as shown in FIG. 12B. Details of these steps can be as described above with reference to FIGS. 10A and 10B.

Figure 12C:
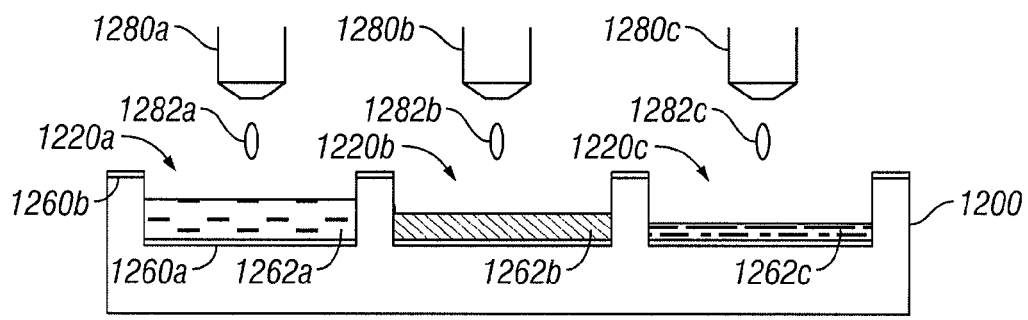
Figure 12D:
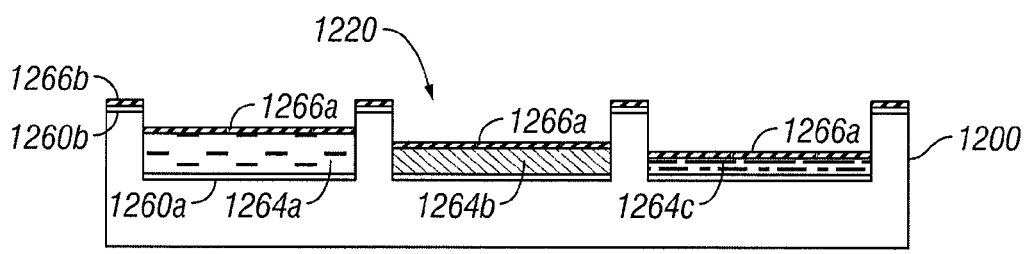

Subsequently, an inkjet process is performed to form liquid layers 1262*a*-1262*c* in the cavities 1220*a*-1120*c*, as shown in FIG. 12C. In the illustrated embodiment, multiple micro-nozzles 1280*a*-1280*c* are aligned over the substrate 1200 with the cavities 1220*a*-1120*c*. Different kinds of liquid compositions 1282*a*-1282*c* (for producing solid transparent layers of different indices) are provided in different amounts into the cavities 1220*a*-1120*c* through the micro-nozzles 1280*a*-1280*c*. The illustrated method uses three different kinds of liquid compositions 1282*a*-1282*c*: a first liquid composition 1282*a* for interferometrically producing a red color; a second liquid composition 1282*b* for interferometrically producing a green color; and a third liquid composition 1282*c* for interferometrically producing a blue color. The first to third liquid compositions 1282*a*-1282*c* contain solutes or particles which will form solid layers after being dried, if necessary, e.g., baked at a next step.

The resulting liquid layers 1262*a*, 1262*b*, 1262*c* can have two or more different thicknesses. The thicknesses of the liquid layers 1262*a*-1262*c* are selected such that solid layers resulting from a subsequent baking process have selected thicknesses to interferometrically produce a desired pattern of colors or grayscale tones in the resulting display. A skilled artisan will appreciate that a thickness of a solid layer can be selected for a specific color (e.g., red, green, or blue) when a specific material is used for the solid layer. In one embodiment where a solid layer for red color is formed of poly (ethylene terephthlate) (PET) which has an index of refraction of 1.65, the thickness of the solid layer may be between about 91 nm and about 111 nm. A solid layer for green color can be formed of poly(methyl methacrylate) which has an index of refraction of 1.49, and can have a thickness between about 109 nm and about 133 nm. A solid layer for blue color can be formed of poly(chlorotrifluoroethylene) which has an index of refraction of 1.39, and can have a thickness between about 125 nm and about 153 nm. Other details of the inkjet process can be as described above with reference to FIG. 11C.

Subsequently, the liquid layers 1262*a*-1262*c* are dried in a separate step, if necessary, such as by baking, to form solid transparent layers. In another embodiment, the liquid layers 1262*a*-1262*c* may be exposed to UV for solidification or polymerization. The solid layers form optical fillers which provide an optical gap for producing interferometric effect in the display device. Next, an absorber 1266*a*, 1266*b* is deposited on the solid layers 1264*a*-1264*c*, and on top of the reflectors 1260*b* on the top surface 1210 of the substrate 1200. Subsequently, a transparent polymer layer (not shown) may be formed over the absorber 1266*a*, 1266*b* to cover substantially the entire top surface of the absorber 1266*a*, 1266*b*, and provide a substantially planar top surface. The details of the steps following the printing process can be as described above with reference to FIGS. 10D and 10E.

c. Inkjet Process on a Substrate with Cavities Having Different Depths

Figure 13A:
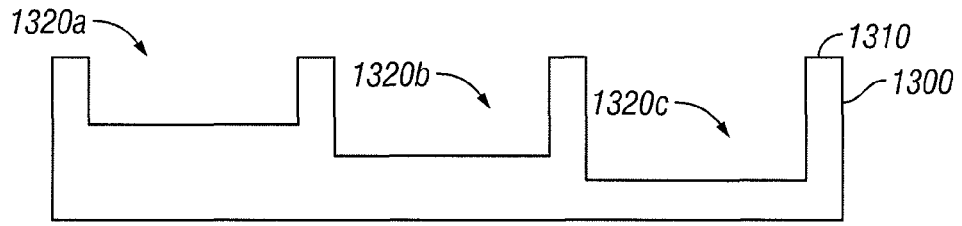
FIGS. 13A-13D illustrate yet another embodiment of a method of making a static interferometric image, including performing a printing process to produce different interferometric colors on a substrate having pre-formed cavities of different depths.

Referring to FIGS. 13A-13D, a method of making a static interferometric image according to yet another embodiment will now be described. The static interferometric image is formed by performing a printing process on a substrate having recesses or cavities of different depths. The depths are on the same order of magnitude as desired optical cavity size. First, a substrate 1300 including cavities 1320*a*-1320*c* of different depths is provided, as shown in FIG. 13A. The depths of the cavities 1320*a*-1320*c* are selected to produce a desired pattern of colors by interferometric effect in combination with optical fillers that will be formed in the cavities 1320*a*-1320*c*. The cavities 1320*a*-1320*c* can be formed by any suitable process, e.g., embossing, photolithography and etching, and inscribing.

Figure 13B:
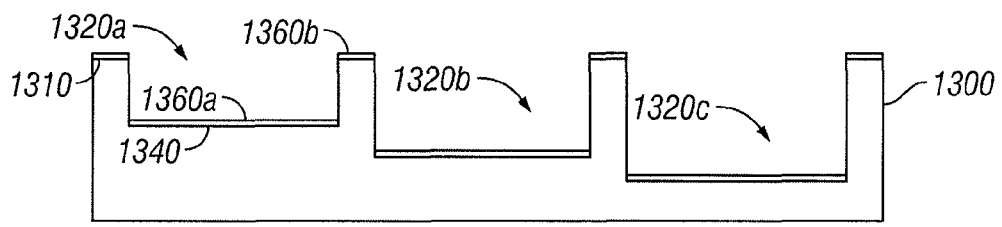

A reflector 1360*a*, 1360*b* is deposited on the bottom surfaces 1340 of the cavities 1320 and on the top surface 1310 of the substrate 1300, as shown in FIG. 13B. The reflector 1360*a*, 1360*b* is discontinuous between the bottom surfaces 1340 of the cavities 1320*a*-1320*c* and the top surface 1310 of the substrate 1300 due to a directional deposition, such as sputtering. In other embodiments, the reflector may be continuous and conformal over the bottom surfaces 1340 of the cavities 1320*a*-1320*c* and the top surface 1310 of the substrate 1300.

Figure 13C:
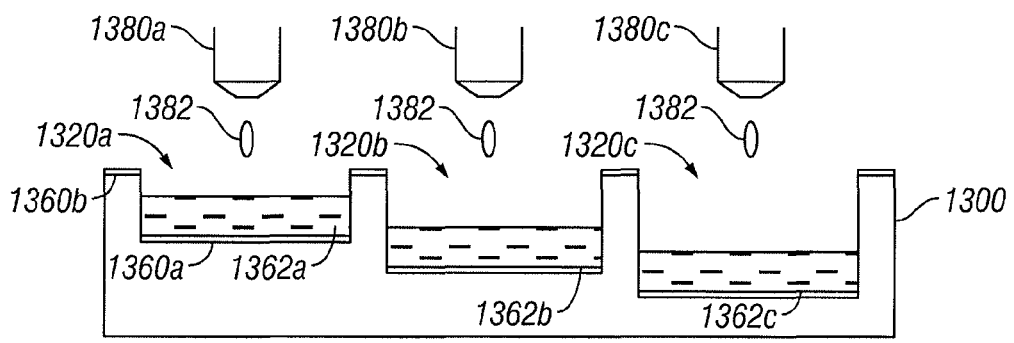

Subsequently, a printing process is performed to form liquid layers 1362*a*-1362*c* in the cavities 1320*a*-1320*c*, as shown in FIG. 13C. In the illustrated embodiment, multiple micro-nozzles 1380*a*-1380*c* are aligned over the substrate 1300 with the cavities 1320*a*-1320*c*. The micro-nozzles can use inkjet technology. A liquid composition 1382 is provided into the cavities 1320*a*-1320*c* through the micro-nozzles 1380*a*-1380*c*. In the illustrated embodiment, the liquid composition 1382 provided into all the cavities 1320*a*-1320*c* has the same solute in the same solvent, and is filled in the cavities 1320*a*-1320*c* in substantially the same amount. In another embodiment, the liquid composition 1382 provided into the cavities 1320*a*-1320*c* may have different concentrations depending on the interferometric colors that the resulting optical fillers will produce in the display. In yet another embodiment, the liquid composition 1382 with the same composition and concentration may be provided into the cavities 1320*a*-1320*c* in different amounts from one another. Other details of the inkjet process can be as described above with reference to FIG. 10C.

In certain embodiments, the same amount and concentration of the liquid composition 1382 is provided into all the cavities 1320*a*-1320*c*, forming liquid layers having substantially the same thickness. Then, the liquid layers are dried, e.g., baked, if necessary, to form solid transparent layers 1364*a*-1364*c* (FIG. 13D) having substantially the same thickness. The thicknesses of the solid layers can be selectively reduced by a suitable process, e.g., laser ablation, to have selected thicknesses to interferometrically produce a desired pattern of colors or grayscale tones in the resulting display. The solid layers form optical fillers that will form portions of the optical cavities for producing interferometric colors in the display device.

The thicknesses of the liquid layers 1362*a*-1362*c* are selected such that the solid layers 1364*a*-1364*c* resulting from the subsequent baking process have selected thicknesses to interferometrically produce a desired pattern of colors or grayscale tones in combination with subsequent structures of non-uniform thickness influenced by the different cavity depths in the resulting display. In addition, the thicknesses of the liquid layers 1362*a*-1362*c* are selected based at least partly on the optical density (index of refraction) of the resulting solid layer material.

Figure 13D:
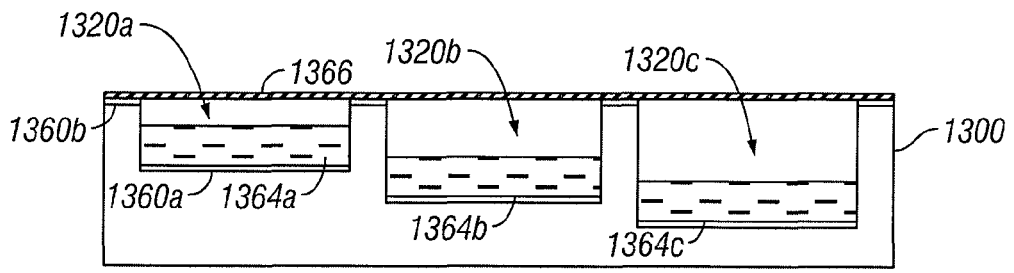

Referring now to FIG. 13D, an absorber 1366 is formed over the cavities 1320*a*-1320*c* and on top of the reflectors 1360*b* on the top surface 1310 of the substrate 1300. In the illustrated embodiment, the solid layers 1364*a*-1364*c* and air gaps over the solid layers 1364*a*-1364*c* define different optical pathlengths for producing different colors. In another embodiment, a transparent polymer may fill the cavities 1320*a*-1320*c* so as to provide a substantially planar top surface on which an absorber layer can be formed. In yet another embodiment, a transparent polymer may be blanket deposited into the cavities 1320*a*-1320*c* and over the reflectors 1360*b* on the top surface 1310 of the substrate 1300. The transparent polymer may be planarized to provide a substantially planar top surface on which an absorber layer can be formed (e.g., deposited or laminated). In these other embodiments, total thicknesses of the solid layers 1364*a*-1364*c* and the transparent polymer define different optical pathlengths for producing different colors. The details of the steps following the inkjet process can be as described above with reference to FIGS. 10D and 10E.

Referring to FIGS. 14A-14D, a method of making a static interferometric image according to yet another embodiment will now be described. The static interferometric image is formed by performing a printing process on a substrate having recesses or cavities of different depths. The printing process forms at least two different layers that have different indices of refraction in two different regions.

Figure 14A:
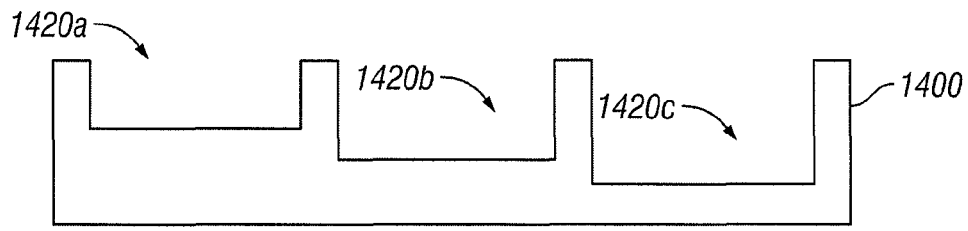
FIGS. 14A-14D illustrate yet another embodiment of a method of making a static interferometric image, including performing a printing process to produce different interferometric colors on a substrate having pre-formed cavities of different depths.
Figure 14B:
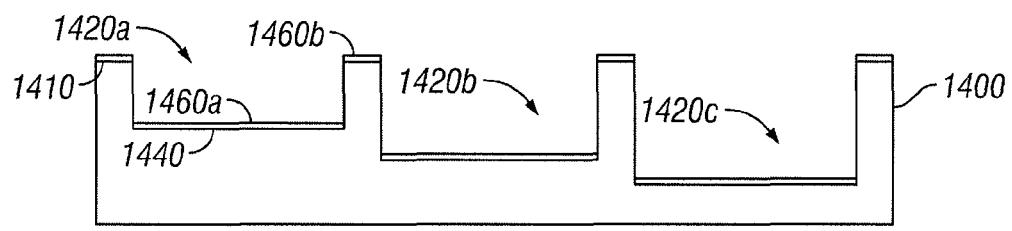
Figure 14C:
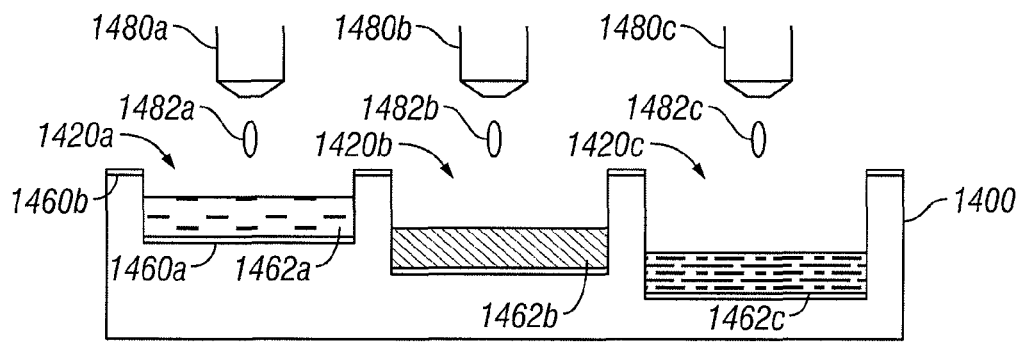
Figure 14D:
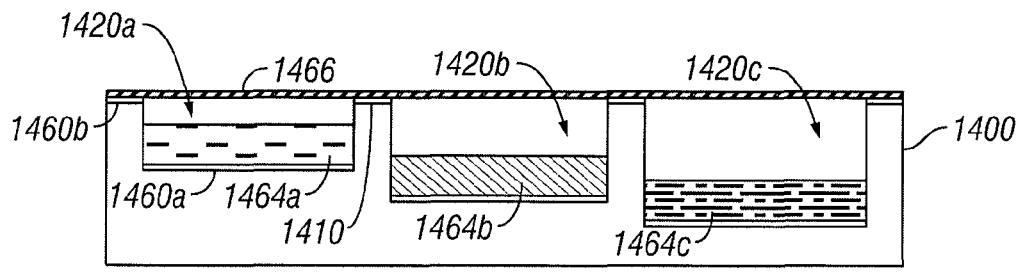

First, a substrate 1400 including cavities 1420*a*-1420*c* of different depths is provided, as shown in FIG. 14A. Subsequently, a reflector 1460*a*, 1460*b* is deposited on the bottom surfaces 1440 of the cavities 1420*a*-1420*c* and on the top surface 1410 of the substrate 1400, as shown in FIG. 14B. Subsequently, an inkjet process is performed to form liquid layers 1462*a*-1462*c* in the cavities 1420*a*-1420*c*, as shown in FIG. 14C. In the illustrated embodiment, different kinds of liquid compositions 1482*a*-1482*c* are provided in substantially the same amount into the cavities 1420*a*-1420*c* through micro-nozzles 1480*a*-1480*c*. In another embodiment, different kinds of liquid compositions 1482*a*-1482*c* may be provided in different amounts into the cavities 1420*a*-1420*c*.

Subsequently, the liquid layers 1462*a*-1462*c* are dried, e.g., baked if necessary to form solid layers 1464*a*-1464*c* having different indices of refraction. Next, an absorber 1466 is formed over the cavities 1420*a*-1420*c* and on top of the reflectors 1460*b* on the top surface 1410 of the substrate 1400. In the illustrated embodiment, the solid layers 1464*a*-1464*c* and air gaps over the solid layers 1464*a*-1464*c* define optical cavities with different optical pathlengths for producing different colors. In another embodiment, a transparent polymer may fill the cavities 1420*a*-1420*c* so as to provide a substantially planar top surface on which an absorber layer can be formed. In yet another embodiment, a transparent polymer may be blanket deposited into the cavities 1420*a*-1420*c* and over the reflectors 1460*b* on the top surface 1410 of the substrate 1400. The transparent polymer may be planarized to provide a substantially planar top surface on which an absorber layer can be formed (e.g., deposited or laminated). In these other embodiments, total thicknesses of the solid layers 1464*a*-1464*c* and the transparent polymer define different optical pathlengths for producing different colors.

Referring to FIGS. 15A-15D, a method of making a static interferometric image according to yet another embodiment will now be described. The static interferometric image is formed by performing a printing process on a substrate having cavities of different depths. The printing process forms at least two different layers that have different thicknesses in two different regions.

Figure 15A:
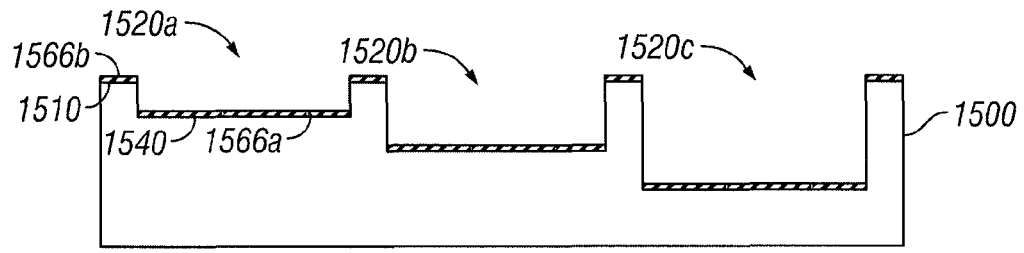
FIGS. 15A-15D illustrate yet another embodiment of a method of making a static interferometric image, including performing a printing process to produce different interferometric colors on a substrate having pre-formed cavities of different depths.
Figure 15B:
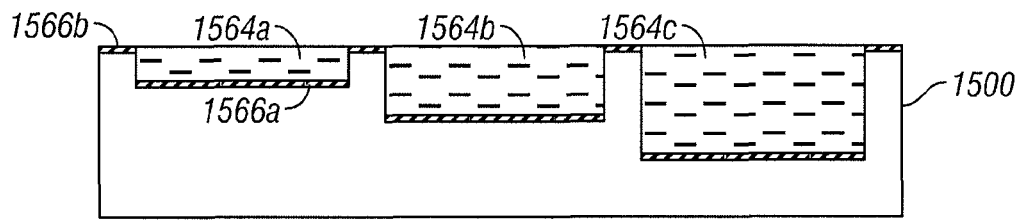
Figure 15C:
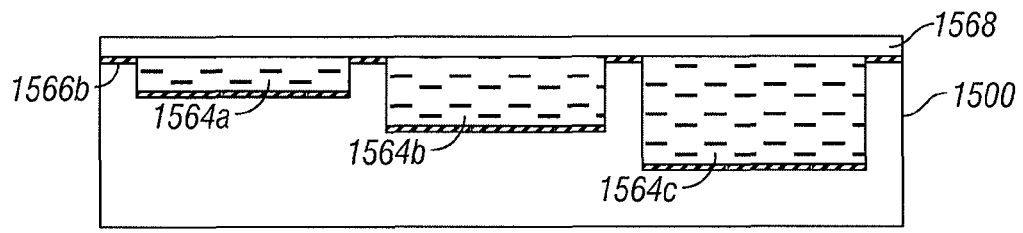
Figure 15D:
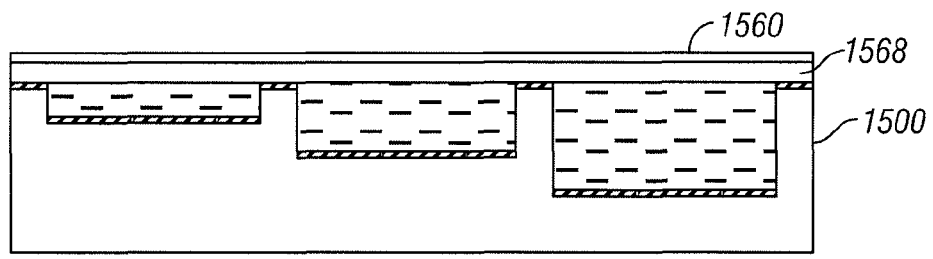

First, a transparent substrate 1500 including cavities 1520 of different depths is provided. Subsequently, an absorber 1566*a*, 1566*b* is deposited on the bottom surfaces 1540 of the cavities 1520*a*-1520*c* and on the top surface 1510 of the substrate 1500, as shown in FIG. 15A. Next, an inkjet process is performed to form liquid layers, which are then dried, e.g., baked, if necessary, to form solid layers 1564*a*-1564*c*. The illustrated solid layers 1564*a*-1564*c* fill the cavities 1520*a*-1520*c*, thereby forming optical fillers, as shown in FIG. 15B. In another embodiment, an optical filler material can be blanket deposited, and an excess optical filler material may be removed (e.g., by etching back) to provide a planar top surface, as shown in FIG. 15B. In certain embodiments, solid layers 1564a-1564d having different optical densities can be formed in the cavities 1520a-1520c, but in the illustrated process, the same material fills each cavity 1520a-1520c.

Subsequently, a transparent polymer layer 1568 is formed over substantially the entire surface of the substrate 1500, covering the absorber 1566b and the optical fillers 1564a-1564c. Examples of transparent polymer materials include, but are not limited to acrylic polymer and polyimide. The transparent polymer layer 1568 may have a thickness between about 100 nm and about 1,000 nm, particularly 500 nm. The thickness of the transparent polymer 1568 may be adjusted to provide optical pathlengths for intended colors.

Next, a reflective layer 1560 is formed on the transparent polymer layer 1568. The reflective layer 1560 may be formed by coating a reflective material on the transparent polymer layer 1568. In another embodiment, the positions of the absorber and reflector may be exchanged with each other, as discussed in more detail below.

d. Positions of Layers

In the embodiments described above with reference to FIGS. 10A-10E, 11A-11D, 12A-12D, 13A-13D, and 14A-14D, the reflectors 1060a, 1160a, 1260a, 1360a, 1460a are formed first on the bottom surfaces 1040, 1140, 1240, 1340, 1440 of the cavities 1020a-1020c, 1120a-1120c, 1220a-1220c, 1320a-1320c, 1420a-1420c, and then the optical fillers 1064a-1064c, 1164a-1164c, 1264a-1264c, 1364a-1364d, 1464a-1464c are formed on the reflectors. Then, the absorbers 1066a, 1166a, 1266a, 1366a, 1466a are formed on the optical fillers. The resulting static interferometric images are shown in FIGS. 10D, 11D, 12D, 13D, and 14D. In these embodiments, the interferometric modulators display images from above, i.e., the images are viewed from over the absorbers.

Figure 16:
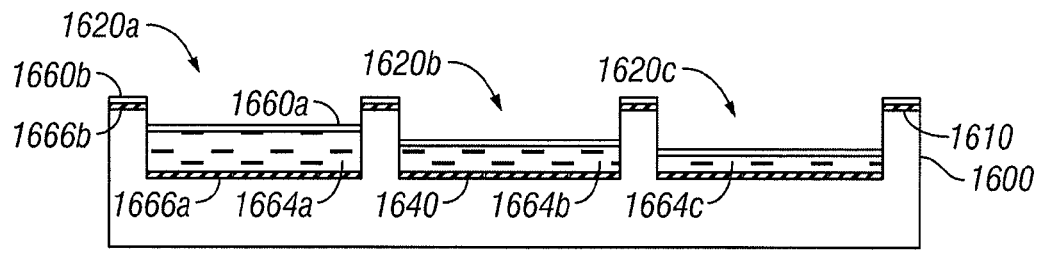
FIG. 16 is a cross section of one embodiment of a static interferometric image including a substrate having pre-formed cavities of the same depth.

In other embodiments, the sequence of the layers may be reversed. FIGS. 15A-15D is one such embodiment. Referring to FIG. 16, an absorber 1666a, 1666b can be first formed on the bottom surfaces 1640 of cavities 1620a-1620c and on the top surface 1610 of a substrate 1600 which is formed of a substantially transparent material. Then, optical fillers 1664a-1664c are formed on the absorber 1666a in the cavities 1620a-1620c. The optical fillers 1664a-1664c may be formed of the same material to have different thicknesses by a printing process. The printing process forms at least two different layers that have different thicknesses in two different regions.

Then, a reflector 1660a, 1660b is formed on the optical fillers 1664a-1664c and on top of the absorber 1666b on the top surface 1610 of the substrate 1600. The resulting static interferometric image is shown in FIG. 16. Similar to the static interferometric image of FIG. 16, static interferometric images in other embodiments can have the same configurations as those of the static interferometric images of FIGS. 11-14 except for the positions of the absorbers and reflectors being exchanged. In these embodiments, the interferometric images display images in the downward direction, i.e., the images are viewed from below the absorbers.

Figure 17:
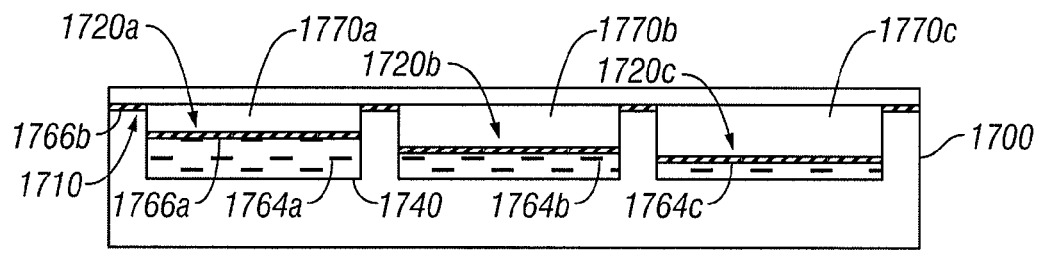
FIG. 17 is a cross section of another embodiment of a static interferometric image including a substrate having pre-formed cavities of the same depth.

Referring to FIG. 17, a method of making a static interferometric image according to yet another embodiment will now be described. In the illustrated embodiment, substantially transparent spacers 1764a-1764c are formed first on the bottom surfaces 1740 of cavities 1720a-1720c in a substantially transparent substrate 1700. The spacers 1764a-1764c can be formed of any suitable readily printed material, for example, acrylic polymer. In the illustrated embodiment, the spacers 1764a-1764c can be formed by a programmable printing process such as the inkjet described above with reference to FIG. 10C, i.e., using the same liquid composition in different amounts or concentrations. The printing process forms at least two different layers that have different thicknesses in two different regions.

Then, an absorber 1766a, 1766b can be formed on the spacers 1764a-1764c and on the top surface 1710 of the substrate 1700. Next, a reflective layer 1760 is formed over substantially the entire top surface of the substrate 1700 covering the cavities 1720a-1720c. The reflective layer 1760 and the absorbers 1766a on the bottom surfaces 1740 of the cavities 1720a-1720c define interferometric air gaps 1770a-1770c having different heights defined by the printing process, depending on a pattern of colors that the cavities 1720a-1720c are to produce. The spacers 1764a-1764c, which are programmably printed, set the sizes of the optical cavities (air gaps) by the difference between initial cavities and the thicknesses of the spacers 1764a-1764c and the absorbers 1766a in the cavities 1720a-1720bc. The fact that the printing process defines the optical pathlength of each cavity or pixel would be true even if the portions of the absorber and reflector were reversed, as is true of all of the embodiments described herein.

Figure 18:
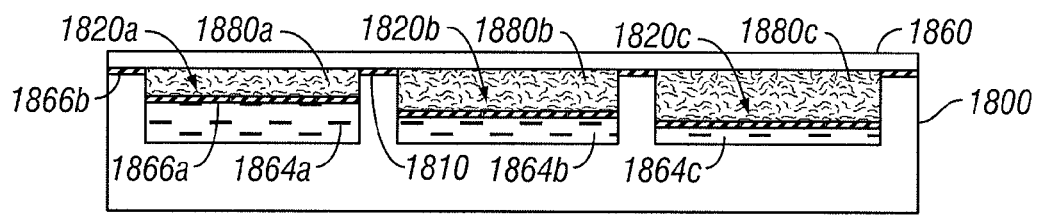
FIG. 18 is a cross section of yet another embodiment of a static interferometric image including a substrate having pre-formed cavities of the same depth.

Referring to FIG. 18, a method of making a static interferometric image according to yet another embodiment will now be described. In the illustrated embodiment, substantially transparent spacers 1864a-1864c are formed first on the bottom surfaces 1840 of cavities 1820a-1820c in a transparent substrate 1800. In the illustrated embodiment, the spacers 1864a-1864c can be formed by a printing process, such as an inkjet process described above with reference to FIG. 10C. The printing process forms at least two different layers that have different thicknesses in two different regions.

Then, an absorber 1866a, 1866b can be formed on the spacers 1864a-1864c and on the top surface 1810 of the substrate 1800. Subsequently, optical fillers 1880a-1880c are formed in the cavities 1820a-1820c, thereby filling up the cavities 1820a-1820c. The optical fillers 1880a-1880c may be formed by any suitable process, for example, an inkjet process, photolithography and etching, spin-on deposition, or blanket deposition and planarization. The illustrated optical fillers 1880a-1880c may be formed of the same material as one another. In other embodiments, the optical fillers 1880a-1880c may be formed of different materials from one another.

Next, a reflective layer 1860 is formed over substantially the entire top surface 1810 of the substrate 1800, covering the cavities 1820a-1820c. The reflective layer 1860 may be formed by coating a reflective material on the optical fillers 1880a-1880c and the absorber 1866b on the top surface 1810 of the substrate 1800. The spacers 1864a-1864c set the sizes of the optical cavities by the difference between initial cavities and the thicknesses of the spacers and the absorber. In this manner, the sizes of optical cavities are defined by thicknesses of the spacers which are programmably deposited by the printing process to different thicknesses in different cavities, thus producing different optical pathlengths and interferometric colors in different regions to produce the desired image. In the illustrated embodiment, the interferometric image displays an image in the downward direction, i.e., the image is viewed from below through the absorbers.

Figure 19:
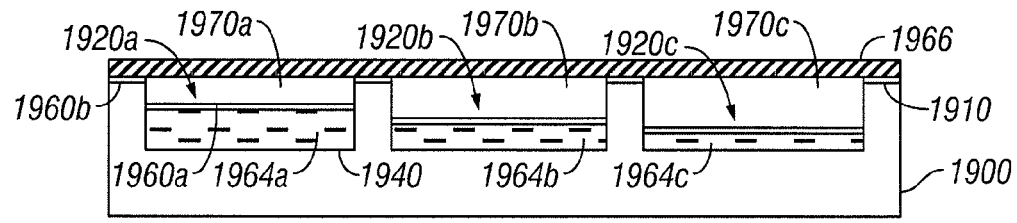
FIG. 19 is a cross section of yet another embodiment of a static interferometric image including a substrate having pre-formed cavities of the same depth.

Referring to FIG. 19, a method of making a static interferometric image according to yet another embodiment will now be described. In the illustrated embodiment, spacers 1964a-1964c are formed first on the bottom surfaces 1940 of cavities 1920a-1920c in a substrate 1900. The substrate 1900 may be formed of an opaque material. The spacers 1964a-1964c can be transparent, as described above, but can be formed of an opaque material, for example, black polyimide or black polyacrylate. In the illustrated embodiment, the spacers 1964a-1964c are printed according to a programmed pattern to have selected thicknesses in selected cavities 1920a-1920c, such as the inkjet process described above with reference to FIG. 10C. The printing process forms at least two different layers that have different thicknesses in two different regions.

Then, reflectors 1960a, 1960b can be formed on the spacers 1964a-1964c and on the top surface 1910 of the substrate 1900. Next, an absorber layer 1966 is formed over substantially the entire top surface 1910 of the substrate 1900, covering the cavities 1920a-1920c. In one embodiment, the absorber layer 1966 may be formed by laminating or attaching an absorber plate or foil onto the substrate 1900. The reflectors 1960a in the cavities 1920a-1920c and the absorber layer 1966 define interferometric air gaps 1970a-1970c having different heights, as defined by thicknesses of the spacers 1964a-1964c, depending on a pattern of colors that the cavities 1920a-1920c are to produce. In other words, the sizes of optical cavities are defined by thicknesses of the spacers which are programmably deposited by the printing process to different thicknesses in different cavities, thus producing different optical pathlengths and interferometric colors in different regions to produce the desired image. In the illustrated embodiment, the interferometric image displays an image in the upward direction, i.e., the image is viewed from above through the absorber 1966. The positions of the absorber and reflector, and hence orientation of the IMODs, can be readily reversed.

Figure 20:
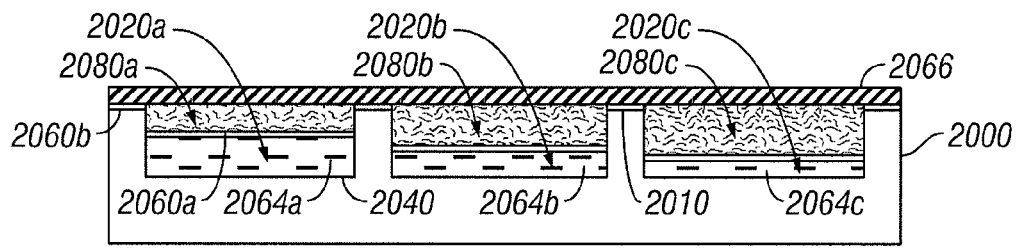
FIG. 20 is a cross section of yet another embodiment of a static interferometric image including a substrate having pre-formed cavities of the same depth.

Referring to FIG. 20, a method of making a static interferometric image according to yet another embodiment will now be described. In the illustrated embodiment, spacers 2064a-2064c are formed first on the bottom surfaces 2040 of cavities 2020a-2020c in a substrate 2000. In the illustrated embodiment, the substrate 2000 need not be transparent. The spacers 2064a-2064c can be formed of a transparent or an opaque material. In the illustrated embodiment, the spacers 2064a-2064c are printed according to a programmed pattern to have selected thicknesses in selected cavities 2020a-2020c, such as in the inkjet process described above with reference to FIG. 10C. The process forms at least two different layers that have different thicknesses in two different regions.

Then, reflectors 2060a, 2060b can be formed on the spacers 2064a-2064c and on the top surface 2010 of the substrate 2000. Subsequently, optical fillers 2080a-2080c are formed in the cavities 2020a-2020c, thereby filling up the cavities 2020a-2020c. The optical fillers 2080a-2080c may be formed by any suitable process, for example, an inkjet process, photolithography and etching, spin-on deposition, or blanket deposition and planarization. The illustrated optical fillers 2080a-2080c may be formed of the same material as one another. In other embodiments, the optical fillers 2080a-2080c may be formed of different materials from one another. The static interferometric image of FIG. 20 is the same as that of FIG. 18 except that the positions of the absorber and reflector are exchanged.

Next, an absorber layer 2066 is formed over substantially the entire top surface of the substrate 2000, covering the cavities 2020a-2020c. The absorber layer 2066 may be formed by coating an absorber material on the optical fillers 2080a-2080c and the reflector 2060b on the top surface 2010 of the substrate 2000. The sizes of optical cavities are defined by thicknesses of the spacers which are programmably deposited by the printing process to different thicknesses in different cavities. The optical fillers 2080a-2080c that fill the optical cavities thus produce different optical pathlengths and interferometric colors in different regions to produce the desired image.

e. Additional Layers for a Static Interferometric image

Figure 21:
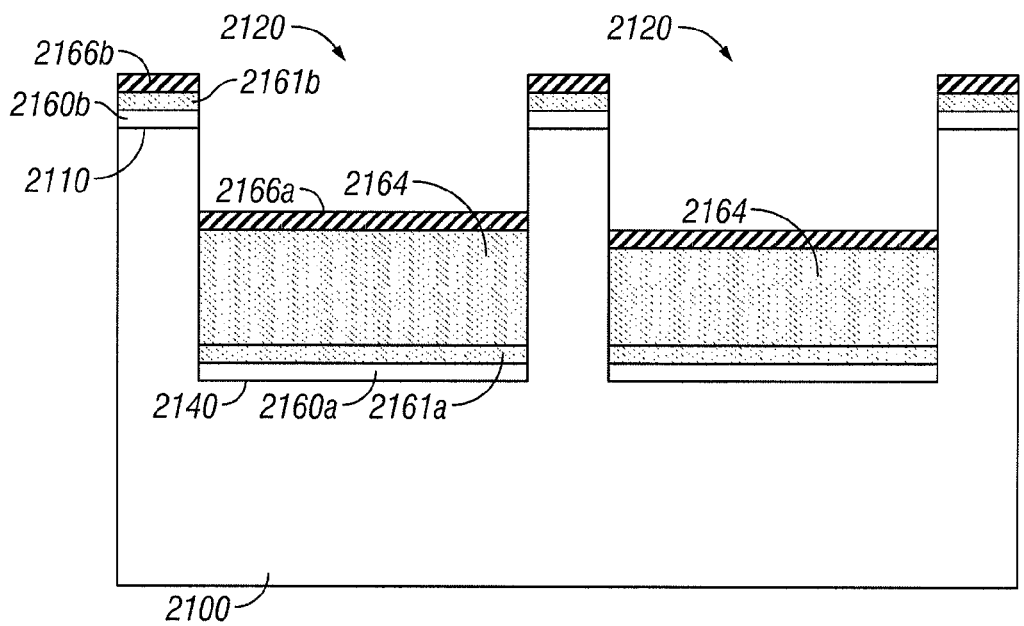
FIG. 21 illustrates another embodiment of a static interferometric image including black masks.

Referring to FIG. 21, one embodiment of a static interferometric image including black masks will now be described below. The illustrated static interferometric image includes a substrate 2100. The substrate 2100 includes cavities 2120 of the same depth. In other embodiments, a substrate may include cavities having different depths.

The static interferometric image further includes reflectors 2160a, 2160b on bottom surfaces 2140 of the cavities 2120 and on a top surface 2110 of the substrate 2100. In addition, transparent layers (e.g., $SiO_2$) 2161a, 2161b are formed on top surfaces of the reflectors 2160a in the cavities 2120, and over the top surface 2110 of the substrate 2100. In addition, optical fillers 2164 are formed on top surfaces of the transparent layers 2161a in the cavities 2120. Absorbers 2166a, 2166b are formed on top surfaces of the optical fillers 2164 in the cavities 2120, and over the top surface 2110 of the substrate 2100. In the illustrated embodiment, the optical pathlength of each of the optical cavities in the interferometric image is defined by a total thickness of the transparent layer 2161a and the overlying optical filler 2164 in the cavity.

The transparent layers 2161b over the top surface 2110 of the substrate serve to provide a black mask. The illustrated transparent layers 216 lb have a thickness and/or a refraction index selected to define an optical pathlength for producing an interferometric black color. In other embodiments, the transparent layers 2161b may have a thickness and a refraction index suitable for producing a white color or any other background color. In the illustrated embodiment, the transparent layer also combines with the optical fillers 2164 that are printed to different thicknesses in different regions to produce optical cavities of different optical pathlengths. A skilled artisan will appreciate that the black mask provided by this embodiment can be adapted for other embodiments described in this document, which may provide different optical pathlengths in other ways (e.g., printing to provide different indices of refraction, or printing spacers to indirectly define the size of the optical cavity).

Figure 22:
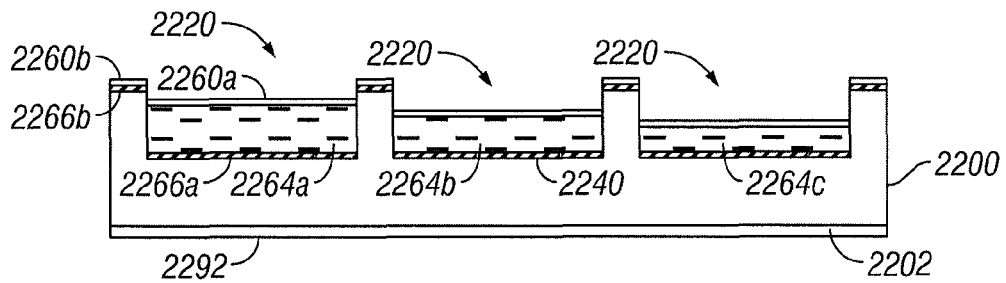
FIG. 22 is a cross section of another embodiment of a static interferometric image including an anti-reflective coating layer.

Referring to FIG. 22, a static interferometric image including an anti-reflective coating layer according to one embodiment will now be described below. The illustrated static interferometric image includes a substrate 2200 having cavities 2220, an absorber 2266a-2266c on the bottom surfaces 2240 of the cavities 2220 and the top surface 2210 of the substrate 2200, optical fillers 2264a-2264c on the absorber 2266a in the cavities 2220, and a reflector 2260a, 2260b on the optical fillers 2264a-2264c and the absorber 2266b on the top surface 2210 of the substrate 2200. The display further includes an anti-reflective (AR) coating layer 2292 on the bottom surface 2202 of the substrate 2200 which forms a displaying surface. The AR coating layer 2292 may be formed of $MgF_2$. In certain embodiments, the AR coating layer 2292 may include multiple AR coating sub-layers. In other embodiments, the static interferometric image may further include an optical diffuser layer on the bottom surface of the AR coating layer 2292 or between the AR coating layer 2292 and the bottom surface 2202 of the substrate 2200.

While illustrated with the static interferometric image of FIG. 10E, it will be understood that a similar AR coating can be employed in conjunction with the interferometric image configurations of FIGS. 11A-11D, 12A-12D, 13A-13D, 14A-14D, 15A-15D, and 16-21. In such embodiments, an AR coating layer can be formed on a displaying surface of the static interferometric image. The display surface refers to a surface which is closer to the absorber than the reflector of the static interferometric image.

f. Layer Formation By Lamination

Figure 23A:
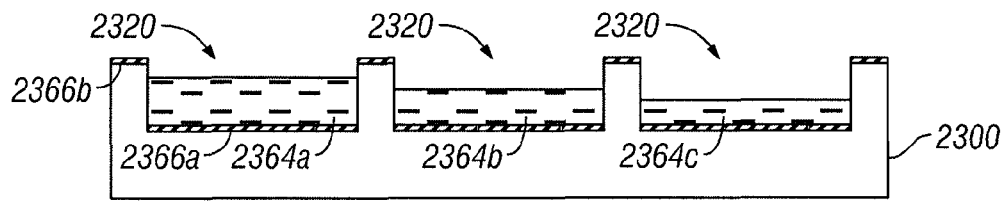
FIGS. 23A-23C illustrate another embodiment of a method of making a static interferometric image by lamination.
Figure 23B:
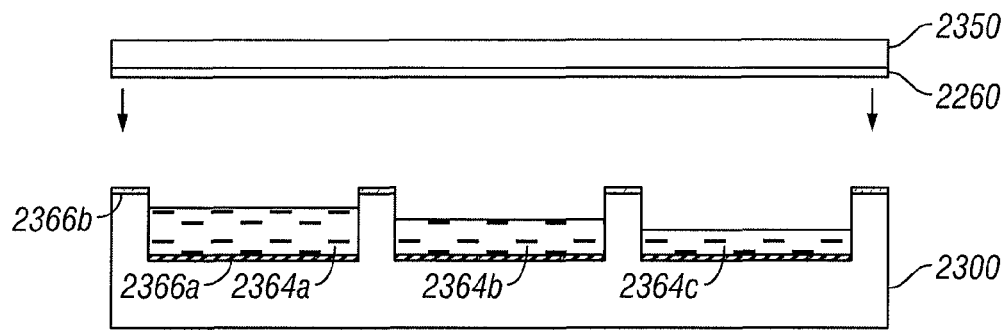
Figure 23C:
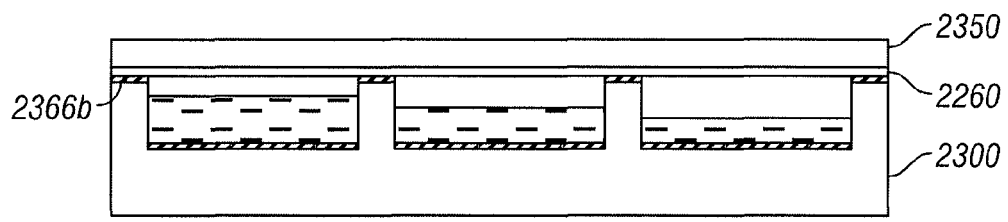

Referring to FIGS. 23A-23C, a method of making a static interferometric image by lamination according to one embodiment will now be described. First, a partially fabricated static interferometric image is provided, as shown in FIG. 23A. The illustrated display includes a first substrate 2300 having cavities 2320, an absorber 2366a-2366c on the bottom surfaces of the cavities 2320 and the top surface of the substrate 2300, optical fillers 2364a-2364c on the absorber 2366a in the cavities 2320. A second substrate 2350 including a reflective layer 2260 formed on a surface thereof is provided. The second substrate 2350 is attached to the first substrate 2300 such that the reflective layer 2260 contacts the absorber 2266b on the top surface of the first substrate 2300, as shown in FIGS. 23B and 23C. The resulting static interferometric image is shown in FIG. 23C. This lamination process can be adapted for the methods described above with reference to FIGS. 15A-15D and 17-20.

In some of the embodiments described above, the absorber, rather than the reflector, can be formed by the lamination process described above, in which case the reflector would be first deposited prior to the optical filler 2364a-2364c. The absorber can be laminated in this fashion for the embodiments of FIGS. 13A-13D and 14A-14D.

2. Inkjet Process on a Substrate with a Lattice Grid

Figure 24A:
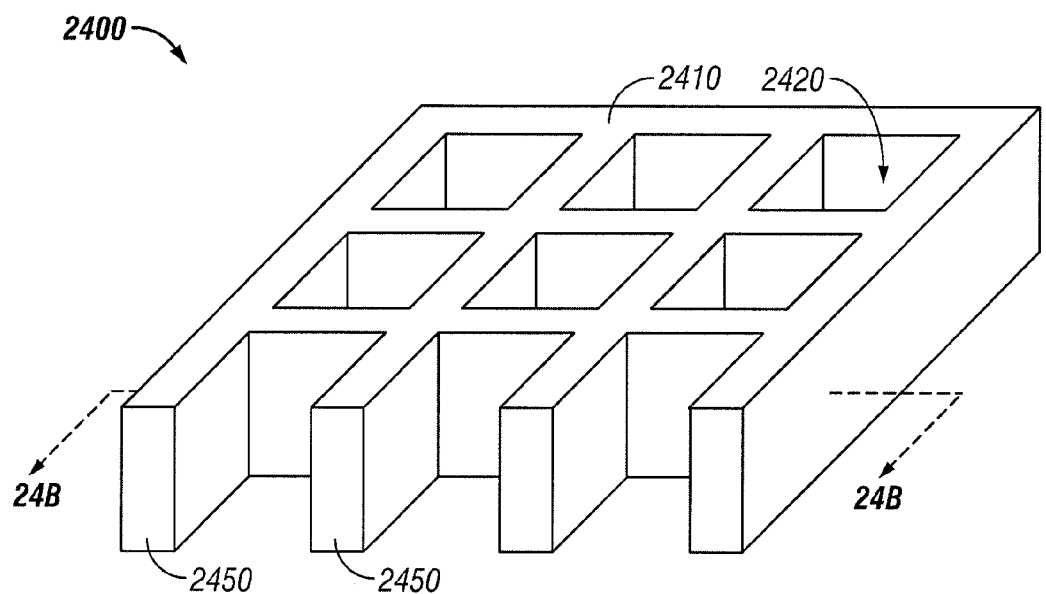
FIG. 24A is a schematic perspective view of one embodiment of a lattice grid for defining cavities in a static interferometric image.
Figure 24B:
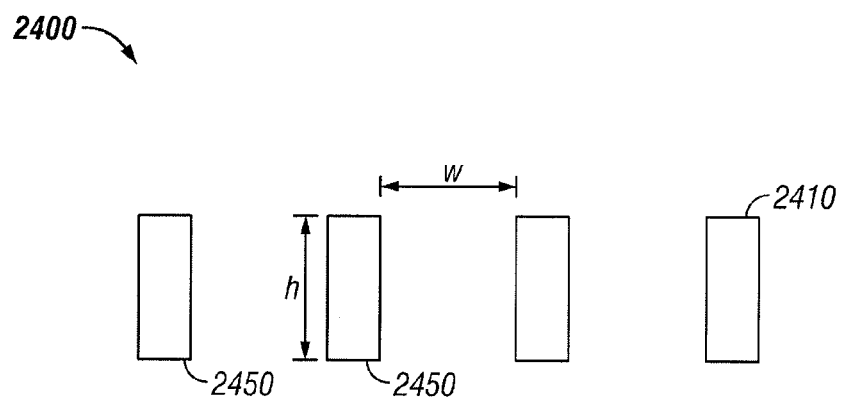
FIG. 24B is a cross section of the lattice grid of FIG. 24A, taken along lines 24B-24B.

In another embodiment, a static interferometric image is formed by performing an inkjet process on a substrate having cavities defined by a lattice grid attached to or deposited on the substrate. Referring to FIGS. 24A and 24B, a lattice grid 2400 includes partitioning walls 2410 and recesses or cells (or openings) 2420 defined by the walls 2410. Each of the walls 2410 may have a height h between about 10 µm and about 50 µm. The cells 2420 may have a width w which is defined as a horizontal distance between two neighboring walls 2410. The cells 2420 may have a width between about 50 µm and about 500 µm. The illustrated cavities 2420 have a square shape when viewed from above. In other embodiments, the recesses or cells can have various other shapes, e.g., a rectangular, hexagonal, octagonal, pentagonal, circular, oval, or diamond shape, or a combination of the foregoing as long as a printer can address the cells separately. The lattice grid need not be orthogonal. In certain embodiments, the lattice grid may have a honeycomb structure. Each of the cells 2420 defines a color or monochrome pixel or dot. The lattice grid 2400 may be formed of acrylic polymer, polyester, or polyethylene naphthalate (PEN). In certain embodiments, the lattice grid 2400 may be formed of an opaque material.

Figure 25A:
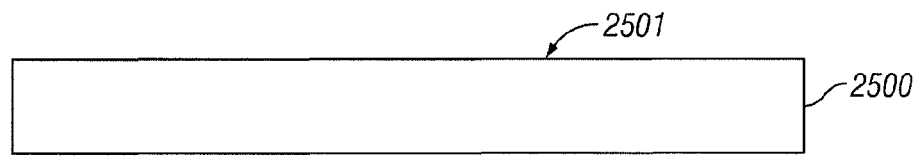
FIGS. 25A-25E illustrate one embodiment of a method of making a static interferometric image, including performing a printing process on a substrate with cavities defined by a lattice grid.
Figure 25B:
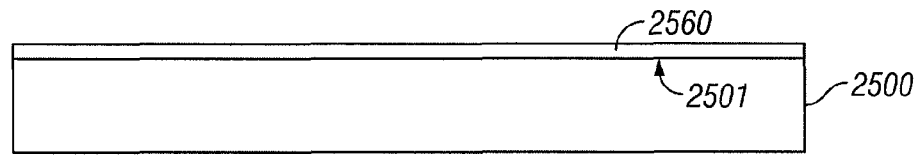
Figure 25C:
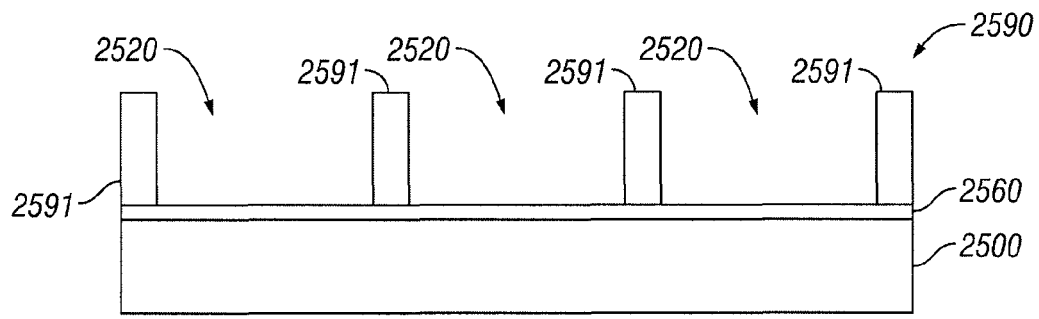

Referring to FIGS. 25A-25E, a method of making a static interferometric image using a lattice grid according to one embodiment will now be described. First, a substrate 2500 having a substantially flat top surface 2501 is provided, as shown in FIG. 25A. A reflective layer 2560 is formed on the top surface 2501 of the substrate 2500, as shown in FIG. 25B.

Subsequently, a lattice grid 2590 is attached onto the top surface of the reflective layer 2560, using, for example, an adhesive. The lattice grid 2590 includes partitioning walls 2591 which define cavities 2520. In certain embodiments, the walls 2591 of the lattice grid 2590 may be formed of an absorptive dark or black material to serve as a black matrix for producing black color between two neighboring pixels of the display.

Figure 25D:
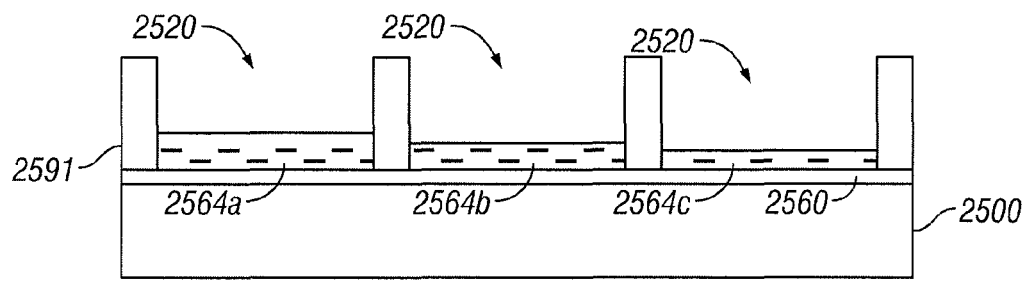
Figure 25E:
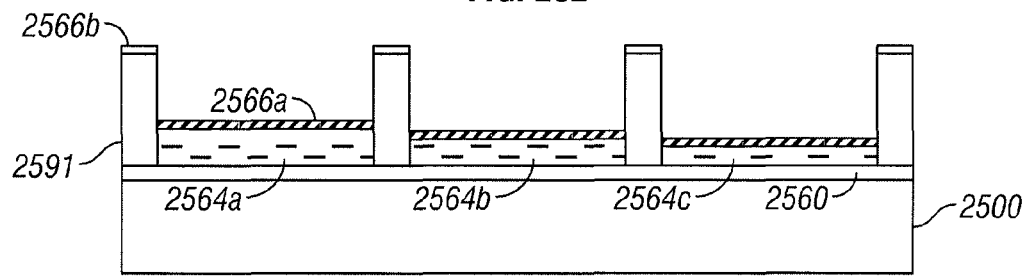

Then, optical fillers 2564a-2564c are formed on the reflective layer 2560, filling portions of the recesses or cells 2520, as shown in FIG. 25D. The illustrated optical fillers 2564a-2564c may be formed by a printing process in which the optical pathlengths of the optical cavities of the interferometric image are programmably defined by the individually addressed deposition for each cell or pixel, such as inkjet process described above with reference to FIG. 10C. In other embodiments, the optical fillers may be formed by one of the inkjet processes described above with reference to 11C, 12C, 13C, and 14C. Then, an absorber 2566a, 2566b is formed on the optical fillers 2564a-2564c and on the top surface of the walls 2591. The resulting static interferometric image is shown in FIG. 25E. An additional layer, such as a transparent polymer layer shown in FIG. 10E, may be further formed over the structure of FIG. 25E.

Figure 26A:
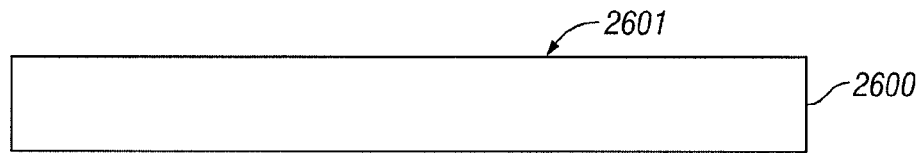
FIGS. 26A-26E illustrate another embodiment of a method of making a static interferometric image, including performing a printing process on a substrate with cavities defined by a lattice grid.
Figure 26B:
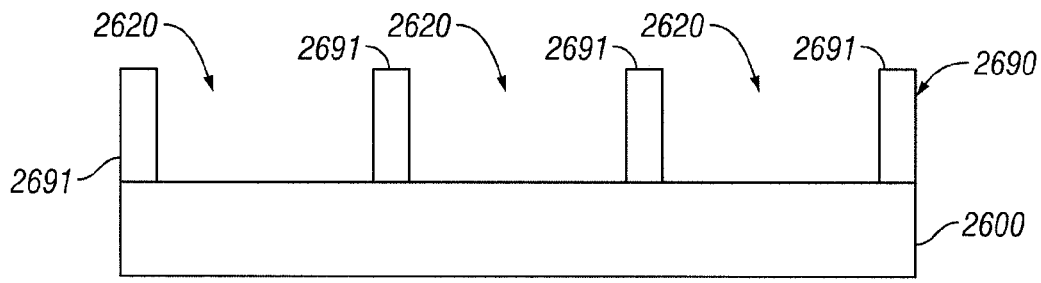
Figure 26C:
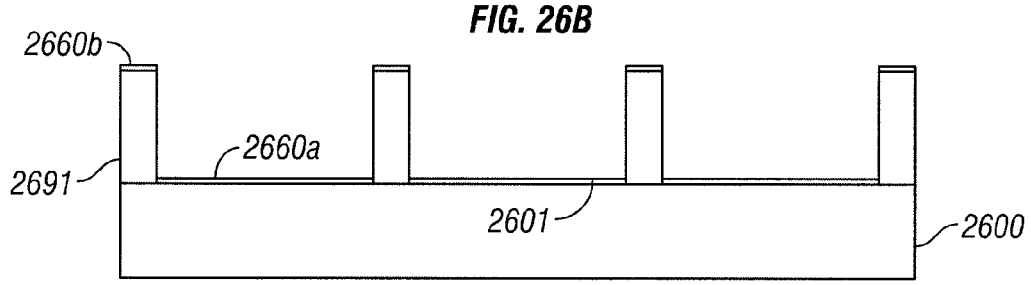

Referring to FIGS. 26A-26E, a method of making a static interferometric image using a lattice grid according to another embodiment will now be described. First, a substrate 2600 having a substantially flat top surface 2601 is provided, as shown in FIG. 26A. Subsequently, a lattice grid 2690 is attached onto the top surface 2601 of the substrate 2600. The lattice grid 2690 includes partitioning walls 2691 which define recesses or cells 2620. Reflectors 2660a, 2660b are formed on exposed portions of the top surface 2601 of the substrate 2600 and on the top surface of the walls 2691 of the lattice grid 2690, as shown in FIG. 26B.

Figure 26D:
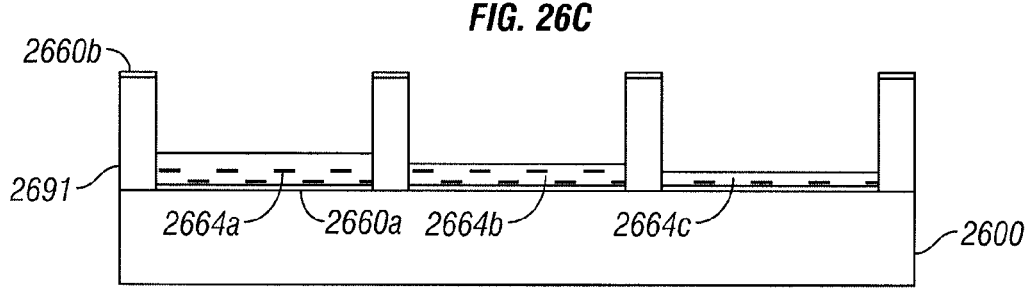
Figure 26E:
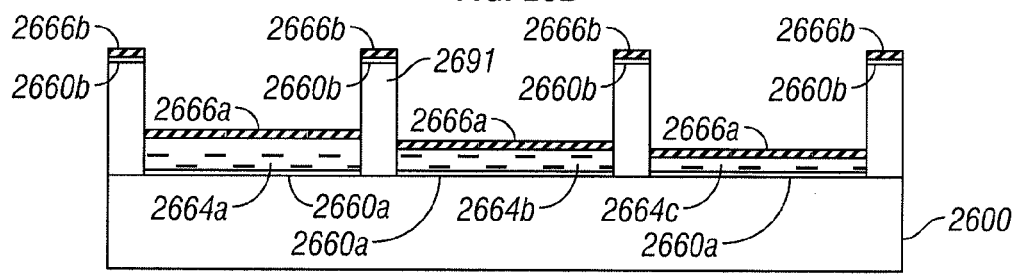

Then, the optical fillers 2664a-2664c are formed on the reflectors 2660a in the cavities 2620, filling portions of the cells 2620, as shown in FIG. 26D. The illustrated optical fillers 2664a-2664c may be formed by a printing process in which the optical pathlengths of the optical cavities of the interferometric image are programmably defined by the individually addressed deposition for each cell or pixel, such as the inkjet process described above with reference to FIG. 10C. In other embodiments, the optical fillers may be formed by one of the inkjet processes described above with reference to 11C, 12C, 13C, and 14C. Then, optical absorbers 2666a, 2666b are formed on the optical fillers 2664a-2664c and on the top surface of the reflector 2660b on the lattice grid 2690. The resulting static interferometric image is shown in FIG. 26E. An additional layer, such as a transparent polymer layer shown in FIG. 10E, may be further formed over the structure of FIG. 26E. In other embodiments, the positions of the absorber and the reflector in FIGS. 25 and 26 can be exchanged. In such embodiments, the substrates should be transparent.

3. Inkjet Process on a Substrate with No Preformed Cavities

Figure 27A:
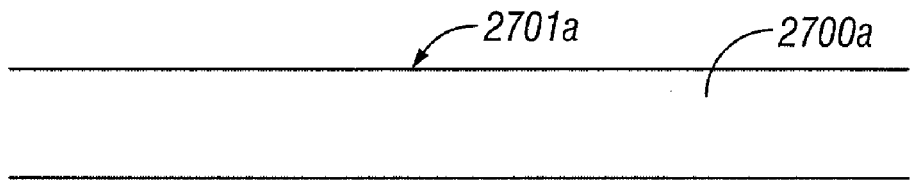
FIG. 27A is a cross section of one embodiment of a substrate having a substantially flat top surface for a static interferometric image.
Figure 27B:
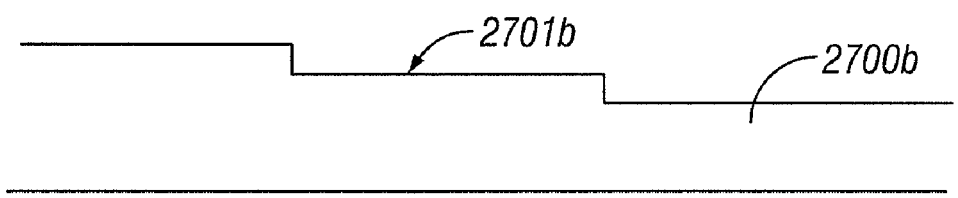
FIG. 27B is a cross section of one embodiment of a substrate having a stepped top surface for a static interferometric image.
Figure 27C:
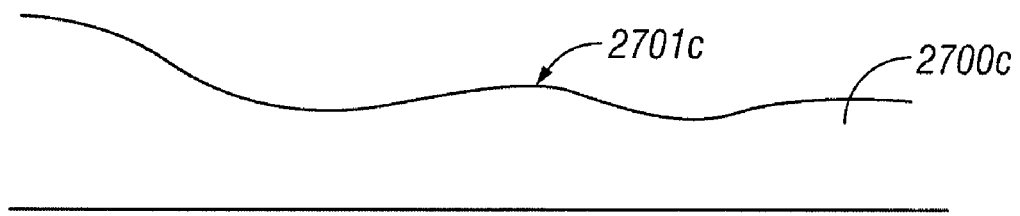
FIG. 27C is a cross section of one embodiment of a substrate having a continuously transitioning top surface for a static interferometric image.

In yet another embodiment, a static interferometric image is formed by performing an inkjet process on a substrate having no pre-formed cavities. In one embodiment, an inkjet process can be performed on a substrate 2700a having a substantially flat top surface 2701a, as shown in FIG. 27A. In another embodiment, an inkjet process can be performed on a substrate 2700b having a stepped top surface 2701b, as shown in FIG. 27B. In yet another embodiment, a printing process can be performed on a substrate 2700c having a continuously transitioning top surface 2701c, as shown in FIG. 27C. It will be appreciated that the embodiments which will be described below can employ any one of the aforementioned substrates 2700a-2700c. The printing process is selected so as not to depend on the preformed recesses of the prior embodiments (cavities, cells of lattice grid) to confine or separate deposited layer that controls optical pathlength from adjacent interferometric modulators of a different color. For example, the deposited materials can be a viscous, self-drying material that adsorbs or adheres strongly to the substrate and/or with sufficient surface tension to keep deposited materials confined.

Figure 28A:
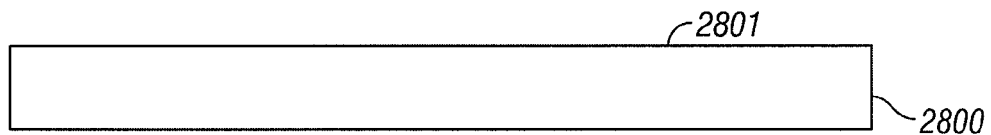
FIGS. 28A-28F illustrate one embodiment of a method of making a static interferometric image, including performing a printing process on a substrate having a substantially flat top surface.
Figure 28B:
Figure 28C:
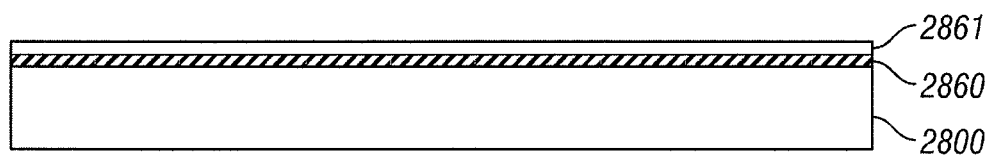

Referring to FIGS. 28A-28F, a method of making a static interferometric image using a substrate with no pre-formed cavities according to one embodiment will now be described. First, a substrate 2800 having a substantially flat top surface 2801 is provided, as shown in FIG. 28A. An absorber layer 2866 is formed on the top surface 2801 of the substrate 2800, as shown in FIG. 28B. Next, a dielectric or other transparent layer 2861 may be optionally formed on the top surface of the absorber layer 2866, as shown in FIG. 28C. The transparent layer 2861 may have a thickness selected to define an interferometric black optical cavity for black mask, e.g. 85 nm of $SiO_2$. In other embodiments, the transparent layer 2861 may be omitted.

Figure 28D:
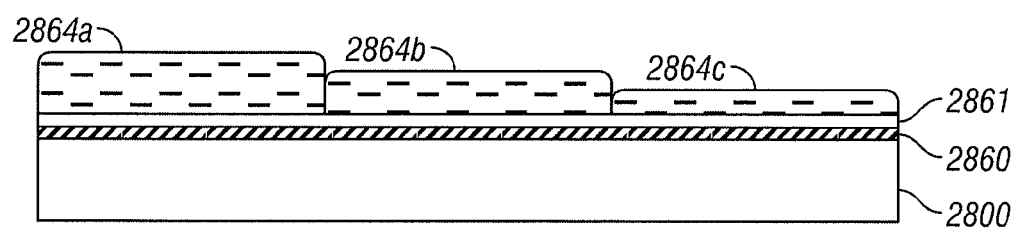
Figure 28E:
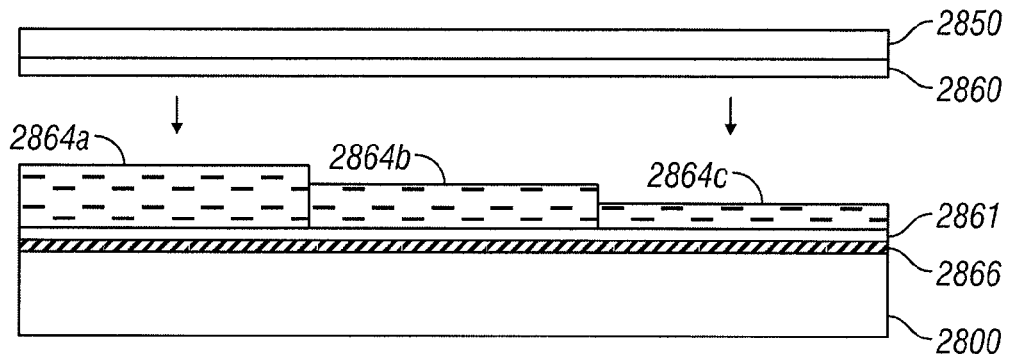
Figure 28F:
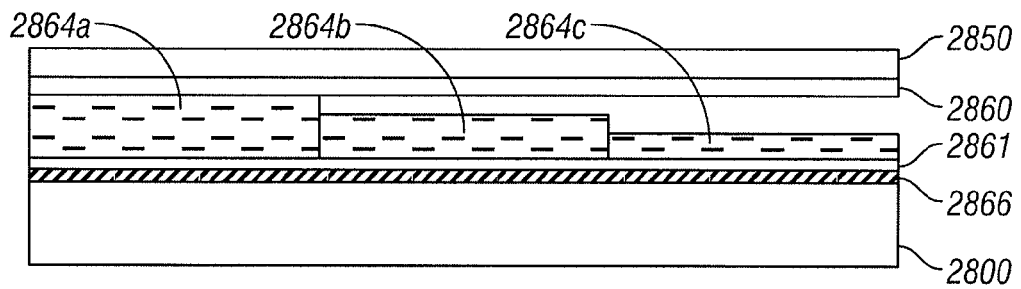

Then, optical fillers 2864a-2864c are formed on the transparent layer 2861, as shown in FIG. 28D. The illustrated optical fillers 2864a-2864c may be formed on regions of the top surface of the transparent layer 2861 by a printing process in which the optical pathlengths of the optical cavities of the interferometric image are programmably defined by the individually addressed deposition for each pixel, such as the inkjet process described above with reference to FIG. 10C, i.e., using the same liquid composition in different amounts or concentrations. The liquid composition may be a viscous, high surface tension, strongly adhering and/or quick-drying material. Then, a second substrate 2850 having a reflective layer 2860 is attached by lamination onto the structure of FIG. 28D, as shown in FIG. 28E. A resulting static interferometric image is shown in FIG. 28F. In the illustrated embodiment, the reflective layer 2860 is supported on pixels with the thickest filler 2864a across the array. In other embodiments, separate posts can be formed over the substrate 2800 to support the reflective layer 2860, either within or at the periphery of the array. Each of the optical pathlengths of the optical cavities of the interferometric image is defined by the materials and distances between the absorber and the reflector, in the illustrated embodiment, including both of the optical fillers 2864a-2864c and the transparent layer 2861.

Figure 29A:
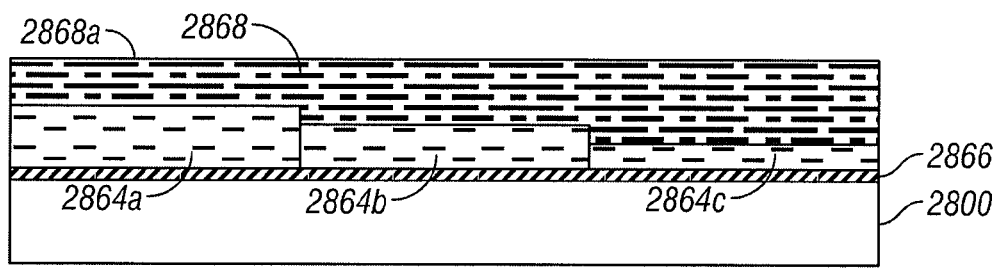
FIGS. 29A-29B illustrate one embodiment of a method of making a reflector on a partially fabricated static interferometric image.
Figure 29B:
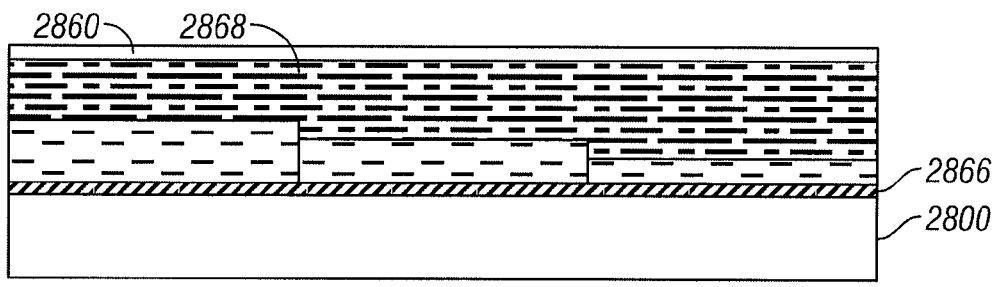

In another embodiment, a transparent polymer 2868 may be formed over the optical fillers 2864a-2864c, as shown in FIG. 29A, to provide a substantially planar top surface 2868a. In one embodiment, the transparent polymer may be a planarizing material, such as a spin-on-glass (SOG) material. The transparent polymer may be formed by spin coating. A reflective layer 2860 may be formed (e.g., sputtered or otherwise deposited) on the top surface 2868a of the transparent polymer 2868. The resulting static interferometric image is shown in FIG. 29B. In another embodiment, a reflective plate can be laminated or attached onto the top surface 2868a of the transparent polymer 2868.

Figure 30A:
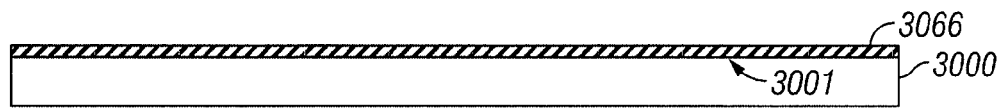
FIGS. 30A-30D illustrate another embodiment of a method of making a static interferometric image, including performing a printing process on a substrate having a substantially flat top surface.
Figure 30B:
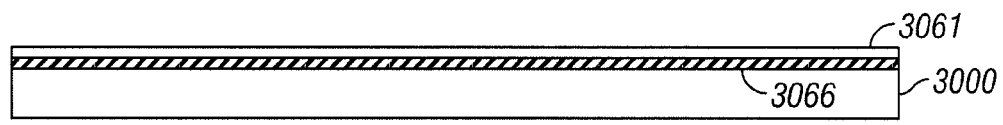

Referring to FIGS. 30A-30D, a method of making a static interferometric image using a substrate with no pre-formed cavities according to another embodiment will now be described. First, a transparent substrate 3000 having a substantially flat top surface 3001 is provided. An absorber layer 3066 is formed on the top surface 3001 of the substrate 3000, as shown in FIG. 30A. Next, a transparent layer 3061 may be optionally formed on the top surface of the absorber layer 3066, as shown in FIG. 30B. The transparent layer 3061 may have a thickness selected to define an interferometric black optical cavity for black mask, e.g. 85 nm of $SiO_2$. In other embodiments, the transparent layer 3061 may be omitted.

Figure 30C:
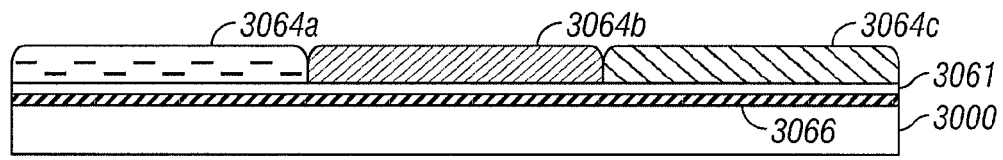
Figure 30D:
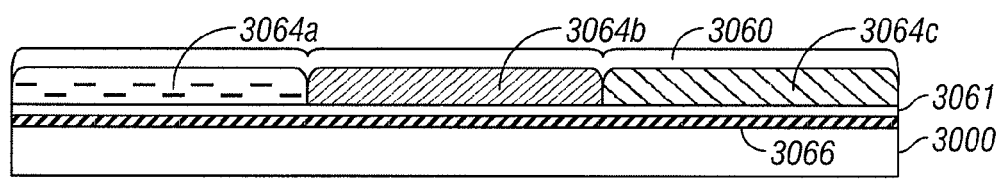

Then, optical fillers 3064a-3064c are formed on the transparent layer 3061, as shown in FIG. 30C. The illustrated optical fillers 3064a-3064c may be formed on regions of the top surface of the transparent layer 3061 by a printing process in which the optical pathlengths of the optical cavities of the interferometric image are programmably defined by the individually addressed deposition for each pixel, such as one of the inkjet processes described above with reference to FIGS. 11C and 12C, i.e., using different liquid compositions in the same amount or different amounts. Then, a reflective layer 3060 may be formed on the top surface of the optical fillers 3064a-3064c. The resulting static interferometric image is shown in FIG. 30D. In another embodiment, a second substrate having a reflective layer may be attached by lamination onto the structure of FIG. 30C, as described above with reference to FIGS. 28E and 28F. In certain embodiments, a transparent polymer may be formed on the optical fillers 3064a-3064c, and then a reflector can be formed over the transparent polymer. In the illustrated embodiment, each of the optical pathlengths of the optical cavities of the interferometric image is defined by the material and thicknesses of both of the optical fillers 3064a-3064c and the transparent layer 3061.

In the embodiments described above with reference to FIGS. 28A-28F and 30A-30D, the absorber layer, the optical fillers, and the reflective layer are formed from the bottom to the top in sequence over the substrate. In other embodiments, the sequence may be reversed, i.e., a reflector layer, optical fillers, and an absorber layer may be formed from the bottom to the top in sequence over a substrate.

Figure 31A:
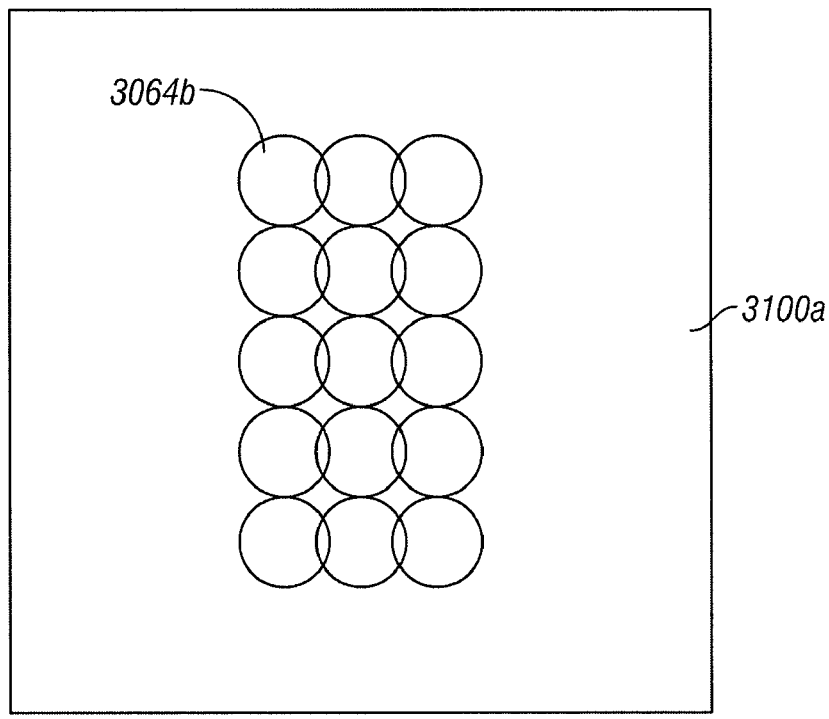
FIG. 31A is a top plan view of a partially fabricated static interferometric image including partially overlapping optical fillers according to one embodiment.
Figure 31B:
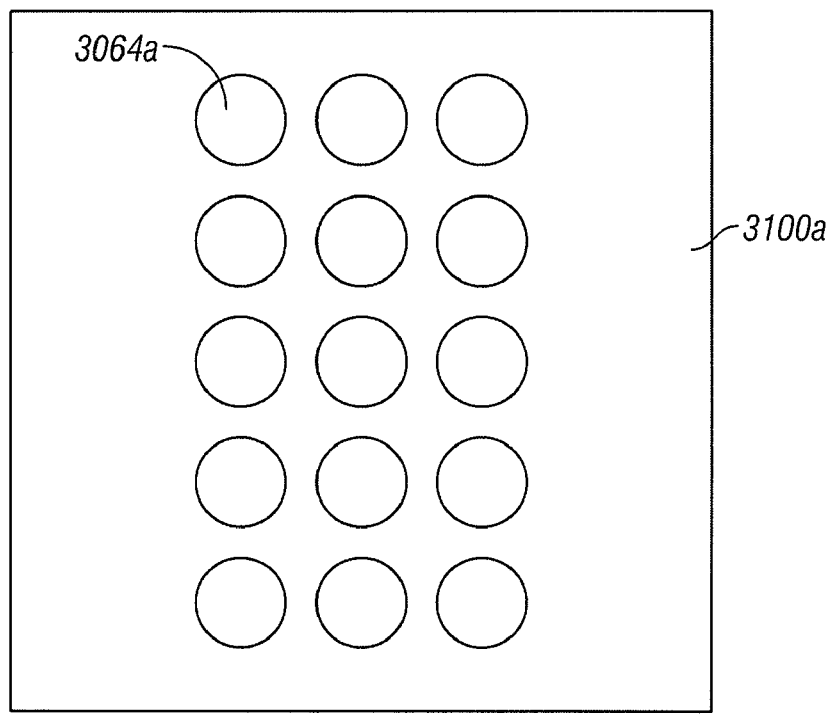
FIG. 31B is a top plan view of a partially fabricated static interferometric image including optical fillers with no overlap according to another embodiment.

In the embodiments illustrated in FIGS. 28A-28F and 30A-30D, optical fillers contact one another when viewed from above, as shown in FIG. 31A. In FIG. 31A, peripheral portions of one of the optical fillers 3064a may be overlapped with peripheral portions of neighboring optical fillers. In other embodiments, optical fillers 3064b may be spaced apart from one another with substantially no overlap with neighboring optical fillers, as shown in FIG. 31B. A black mask may make interstitial regions appear black. In other embodiments, the interstitial regions may be made to display white or any other background color by choice of thickness and refraction index of the transparent layer 2861, 3061.

Referring to FIGS. 32A-32E, a method of making a static interferometric image using a substrate with no pre-formed cavities according to yet another embodiment will now be described. In the illustrated embodiment, a transparent layer is used to provide an optical pathlength, i.e., an interferometric gap for black color on regions between adjacent optical fillers.

Figure 32A:
FIGS. 32A-32E illustrate another embodiment of a method of making a static interferometric image including a transparent layer for providing an interferometric black background.
Figure 32B:
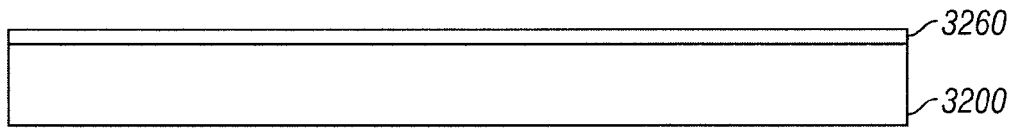
Figure 32C:
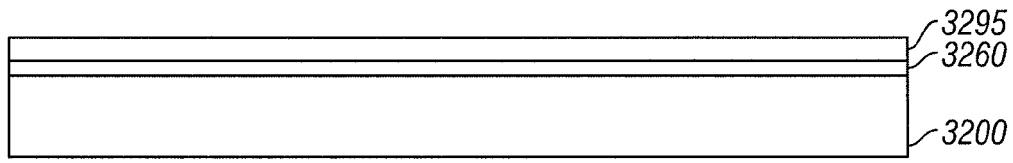

First, a substrate 3200 having a substantially flat top surface 3201 is provided, as shown in FIG. 32A. A reflective layer 3260 is formed on the top surface 3201 of the substrate 3200, as shown in FIG. 32B. Next, a transparent layer 3295 is formed on the top surface of the reflective layer 3260, as shown in FIG. 32C. In one embodiment, the transparent layer 3295 may be formed of a material having a refraction index between about 1.3 and about 1.8. An exemplary material for the transparent layer 3295 is silicon dioxide ($SiO_2$). In another embodiment, an organic material, such as polyimide, can be used for the transparent layer 3295.

Figure 32D:
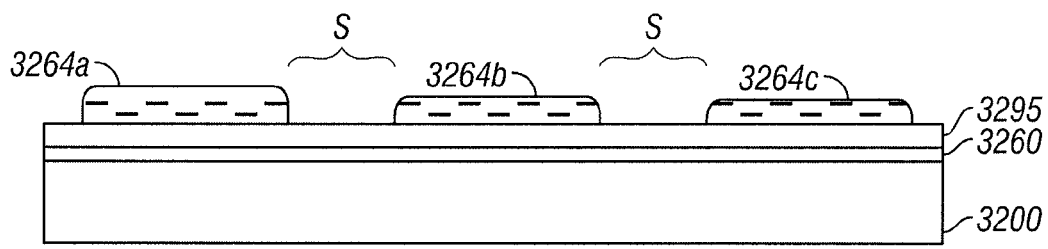

Then, the optical fillers 3264a-3264c are formed on the transparent layer 3295, as shown in FIG. 32D. The illustrated optical fillers 3264a-3264c may be formed on regions of the top surface of the transparent layer 3295 by one of the inkjet processes described above with reference to FIG. 10C (i.e., using the same liquid composition in different amounts or concentrations) and FIGS. 11C and 12C (i.e., using different liquid compositions in the same amount or different amounts). In certain embodiments, the optical fillers 3264a-3264c may be formed of the same material as the transparent layer 3295. The illustrated optical fillers 3264a-3264c are spaced apart from one another, having spaces S between neighboring optical fillers.

Figure 32E:
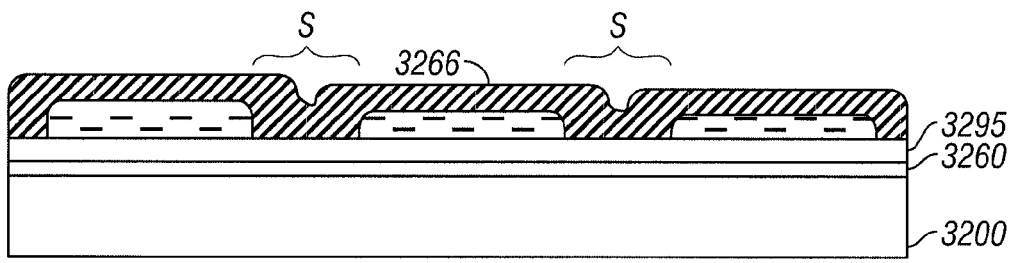

Then, an absorber layer 3266 may be formed on the top surface of the optical fillers 3264a-3264c and exposed portions of the transparent layer 3295. The resulting static interferometric image is shown in FIG. 32E. In another embodiment, a second substrate having an absorber layer may be attached by lamination onto the structure of FIG. 32D, as described above with reference to FIGS. 28E and 28F. In certain embodiments, a transparent polymer may be formed on the optical fillers 3264a-3264c, and then an absorber can be formed over the transparent polymer.

In the resulting static interferometric image shown in FIG. 32E, the transparent layer 3295 serves to define an interferometric gap for black color. Thus, the static interferometric image displays black color from the spaces S between neighboring optical fillers 3264a-3264c. In other displaying regions of the static interferometric image, a desired color is produced by an optical path defined by a total thickness of the transparent layer 3295 and one of the optical fillers 3264a-3264c. A skilled artisan will appreciate that the thicknesses of the optical fillers 3264a-3264c can be selected for producing desired colors based on the optical properties of the transparent layer 3295 and the optical fillers 3264a-3264c.

In the illustrated embodiment, the reflective layer, the transparent layer, the optical fillers, and the absorber layer are formed in sequence over the substrate. In other embodiments, the sequence may be different. For example, an absorber layer, a transparent layer, optical fillers, and a reflective layer may be formed in sequence over a substrate. A skilled artisan will appreciate that the transparent layer 3295 for optical black may be employed in any of the embodiments described above.

Figure 33:
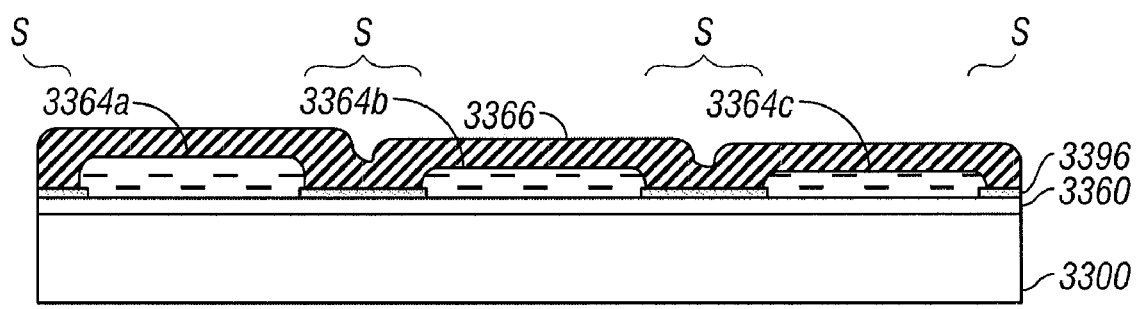
FIG. 33 is a cross section of one embodiment of a static interferometric image including a black matrix between interferometric color pixels.

Referring to FIG. 33, a static interferometric image using a substrate with no pre-formed cavities according to yet another embodiment will now be described. The illustrated display includes a substrate 3300, a reflective layer 3360 on the substrate 3300, an absorptive black matrix 3396, optical fillers 3364a-3364c, and an absorber layer 3366. The black matrix 3396 is formed or printed on the reflective layer 3360. In other embodiments, the black matrix 3396 may be prefabricated and attached to the reflective layer 3360. In one embodiment, the black matrix 3396 may define a plurality of openings in a matrix form, when viewed from above, like 3100a in FIG. 31B. The black matrix 3396 may be formed of a material containing an absorptive black pigment. The black matrix 3396 may have a thickness between about 100 nm and about 1,500 nm. The black matrix 3296 serves to display black background color from spaces S between neighboring optical fillers 3364a-3364c. In other embodiments, the spaces S may be made to display white or any other background color.

The optical fillers 3364a-3364c are formed on regions of the reflective layer 3360 exposed through the openings of the black matrix 3396. The illustrated optical fillers 3364a-3364c may be formed a printing process in which the optical pathlengths of the optical cavities of the interferometric image are programmably defined by the individually addressed deposition for each pixel, such as by one of the inkjet processes described above with reference to FIG. 10C (i.e., using the same liquid composition in different amounts or concentrations) and FIGS. 11C and 12C (i.e., using different liquid compositions in the same amount or different amounts).

The absorber layer 3366 may be formed conformally on the top surface of the optical fillers 3364a-3364c. In another embodiment, a second substrate having an absorber layer may be attached by lamination, instead of forming an absorber conformally, as shown in FIG. 33. In certain embodiments, a transparent polymer may be formed on the optical fillers 3364a-3364c, and then an absorber can be formed over the transparent polymer.

In the illustrated embodiment, the reflective layer, the optical fillers, and the absorber layer are formed from the bottom to the top in sequence over the substrate. In other embodiments, the sequence may be different, for example, an absorber layer, optical fillers, and a reflective layer may be formed from the bottom to the top in sequence over a substrate. In such embodiments, the substrate needs to be transparent.

The embodiments described above with reference to FIGS. 27A-27C, 28A-28F, 29A, 29B, 30A-30D, 31A, 31B, 32A-32E, and 33 can also employ an additional layer, such as a transparent polymer layer as shown in FIG. 10F, an antireflective (AR) coating layer as shown in FIG. 22, an optical diffuser layer, and/or a protective layer.

In the embodiments described above, optical fillers or spacers define or control by themselves or in conjunction with other layers or gap defining structures, the optical cavities for static interferometric images. These fillers (forming part of the optical cavities) or spacers (defining the size of an adjacent optical cavity) are formed to produce a desired pattern of colors or grayscale tones by a programmable printing process, such as an inkjet process. The inkjet process can be performed without a pre-formed mask by a computer. The computer controls micro-nozzles dispensing liquid compositions, based on an image being produced. Thus, a number of different images can be produced by simply instructing the computer to change the image being produced. Thus, mass production of different static interferometric images are possible at a low cost. In addition, static interferometric images can be made with a reduced number of deposition steps, which also reduces manufacturing costs, compared to a conventional semiconductor fabrication techniques normally employed to define interferometric modulators. In addition, the inkjet process can use a standard printing technique which is widely available at a low cost and does not require expensive equipments.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. In addition, those skilled in the art will appreciate that one aspect, step, or component in one embodiment may apply to any one of the other embodiments. As will be recognized, the present invention may be embodied within a form that does not provide all of the features and benefits set forth herein, as some features may be used or practiced separately from others.

The invention claimed is:

1. A static interferometric image device comprising:
    a substrate including a first surface, the substrate including a lattice structure defining cavities having substantially the same depth as one another;
    an absorber layer formed over the first surface;
    a stationary reflective layer formed over the first surface, the reflective layer being vertically spaced apart from the absorber layer; and
    a plurality of solidified optical fillers formed in the cavities, the plurality of solidified optical fillers being interposed between the absorber layer and the reflective layer, the plurality of solidified optical fillers being formed of an at least partially transparent material, the plurality of solidified optical fillers being positioned laterally adjacent to one another to form an array over the first surface of the substrate, wherein the plurality of solidified optical fillers are configured to define a pattern of different optical pathlengths between the absorber layer and the reflective layer, based on an image which the static interferometric image device is configured to display.

2. The device of claim 1, wherein the lattice structure is integrally formed with and of the same material as the substrate.

3. The device of claim 1, wherein the lattice structure is formed of a material different from the substrate.

4. The device of claim 3, further including an adhesive layer between the lattice structure and the first surface of the substrate.

5. The device of claim 1, wherein the plurality of solidified optical fillers are formed of the same material, and wherein one or more of the solidified optical fillers have a different thickness corresponding to a different optical pathlength and different interferometric color from the others of the solidified optical fillers.

6. The device of claim 1, wherein the plurality of solidified optical fillers comprise a first solidified optical filler formed of a first material, and a second solidified optical filler formed of a second material, and wherein the first and second materials have different indices of refraction.

7. A static interferometric image device comprising:
a substrate including a first surface including a substantially planar pixel array region;
an absorber layer formed over the pixel array region;
a reflective layer formed over the pixel array region, the reflective layer being vertically spaced apart from the absorber layer; and
a plurality of solidified optical fillers interposed between the absorber layer and the reflective layer, the plurality of solidified optical fillers being formed of an at least partially transparent material, the plurality of solidified optical fillers being positioned laterally adjacent to one another to form an array over the pixel array region, wherein the plurality of solidified optical fillers are configured to define a pattern of optical pathlengths between the absorber layer and the reflective layer, based on an image which the static interferometric image device is configured to display.

8. The device of claim 7, further including a black matrix including a plurality of openings over the pixel array region, wherein the plurality of solidified optical fillers fills at least part of the plurality of openings.

9. The device of claim 7, further including a transparent layer between the absorber layer and the reflective layer, wherein the plurality of solidified optical fillers are laterally spaced apart from one another, wherein the transparent layer is configured to define an optical path for interferometrically producing black color between the absorber layer and the reflective layer.

10. The device of claim 1, wherein the reflective layer is positioned over the absorber layer.

11. The device of claim 1, wherein the reflective layer is positioned below the absorber layer.

12. The device of claim 1, further including a substantially transparent polymer layer between the reflective layer and the absorber layer, the polymer layer extending over substantially the entire portion of the pixel array region.

13. A static interferometric image device comprising:
a substrate including a plurality of cavities having substantially the same depth, the cavities having bottom surfaces;
an absorber layer formed over the substrate;
a stationary reflective layer opposing the absorber layer, the reflective layer being vertically spaced apart from the absorber layer, wherein at least one of the absorber layer and the reflective layer is positioned in the cavities; and
a plurality of solidified spacers formed in the cavities, the solidified spacers being contacted by and interposed between the bottom surfaces of the cavities and the at least one of the absorber layer and reflective layer, wherein the plurality of solidified spacers are configured to position the at least one of the absorber layer and reflective layer to define a pattern of optical paths between the absorber layer and the reflective layer, based on an image which the static interferometric image device is configured to display.

14. The device of claim 7, wherein the plurality of solidified optical fillers are formed of the same material, and wherein one or more of the solidified optical fillers have a different thickness from the others of the solidified optical fillers.

15. The device of claim 7, wherein the plurality of solidified optical fillers comprise a first solidified optical filler formed of a first material, and a second solidified optical filler formed of a second material, and wherein the first and second materials have different indices of refraction.

16. The device of claim 7, wherein the reflective layer is positioned over the absorber layer.

17. The device of claim 7, wherein the reflective layer is positioned below the absorber layer.

18. The device of claim 7, further including a substantially transparent polymer layer between the reflective layer and the absorber layer, the polymer layer extending over substantially the entire portion of the first surface.

19. The device of claim 13, wherein the stationary reflective layer is positioned over the absorber layer.

20. The device of claim 13, wherein the stationary reflective layer is positioned below the absorber layer.

21. The device of claim 13, further including a plurality of solidified optical fillers positioned over the plurality of solidified spacers.

22. The device of claim 21, wherein the plurality of solidified optical fillers are formed of the same material, and wherein one or more of the solidified optical fillers have a different thickness corresponding to a different optical pathlength and different interferometric color from the others of the solidified optical fillers.

23. The device of claim 21, wherein the plurality of solidified optical fillers comprise a first solidified optical filler formed of a first material, and a second solidified optical filler formed of a second material, and wherein the first and second materials have different indices of refraction.

* * * * *

UNITED STATES PATENT AND TRADEMARK OFFICE
CERTIFICATE OF CORRECTION

PATENT NO. : 8,310,758 B2  Page 1 of 1
APPLICATION NO. : 13/207874
DATED : November 13, 2012
INVENTOR(S) : Miles et al.

It is certified that error appears in the above-identified patent and that said Letters Patent is hereby corrected as shown below:

In the Specifications:

In column 1 at line 8, Change "12/116/791," to --12/116,791,--.

In column 10 at line 57, Change "pyrollidone." to --pyrrolidone.--.

In column 11 at line 9, Change "pyrollidone." to --pyrrolidone.--.

In column 14 at line 30, Change "terephthlate)" to --terephthalate)--.

In column 20 at line 28, Change "216 1b" to --2161 b--.

Signed and Sealed this
Fourteenth Day of May, 2013

Teresa Stanek Rea
*Acting Director of the United States Patent and Trademark Office*